(12) United States Patent
Sakata et al.

(10) Patent No.: US 12,339,647 B2
(45) Date of Patent: Jun. 24, 2025

(54) PRODUCTION LINE DESIGN APPARATUS, PRODUCTION LINE DESIGN SYSTEM, AND PRODUCTION LINE DESIGN METHOD

(71) Applicant: Hitachi, Ltd., Tokyo (JP)

(72) Inventors: Hiroyuki Sakata, Tokyo (JP); Daisuke Tsutsumi, Tokyo (JP); Takahiro Nakano, Tokyo (JP)

(73) Assignee: HITACHI, LTD., Tokyo (JP)

(*) Notice: Subject to any disclaimer, the term of this patent is extended or adjusted under 35 U.S.C. 154(b) by 355 days.

(21) Appl. No.: 17/954,393

(22) Filed: Sep. 28, 2022

(65) Prior Publication Data

US 2023/0131077 A1    Apr. 27, 2023

(30) Foreign Application Priority Data

Oct. 21, 2021   (JP) .................................. 2021-172081

(51) Int. Cl.
G05B 19/4155   (2006.01)

(52) U.S. Cl.
CPC .................... *G05B 19/4155* (2013.01); *G05B 2219/31372* (2013.01)

(58) Field of Classification Search
None
See application file for complete search history.

(56) References Cited

U.S. PATENT DOCUMENTS

| | | | |
|---|---|---|---|
| 11,256,241 B1* | 2/2022 | Sobalvarro | G05B 19/41885 |
| 2021/0311464 A1* | 10/2021 | Kajita | G05B 19/41805 |
| 2023/0221706 A1* | 7/2023 | Nakano | G06Q 10/06 700/97 |
| 2024/0036561 A1* | 2/2024 | Nakano | G06F 30/10 |

FOREIGN PATENT DOCUMENTS

WO    2019/021938 A1    1/2019

\* cited by examiner

*Primary Examiner* — Ryan A Jarrett
(74) *Attorney, Agent, or Firm* — MATTINGLY & MALUR, PC

(57) ABSTRACT

The production line design apparatus includes a memory unit configured to store resource configuration information defining production resources constituting a production line to be designed, resource arrangement constraint information defining an arrangement constraint on the production resources, a production condition to be satisfied by the production line, work allocation information including a workpiece allocated to the production resources and a number of the workpiece, work order information including the production resources used in setup works of the production line and an order of the setup works, and resource candidate information defining a specification of the production resources; a layout generation unit configured to generate a plurality of layout candidates for each of the resource configuration information, where the layout candidate satisfies the arrangement constraint and the production condition; and a setup time calculation unit configured to calculate a setup time for each layout candidate.

11 Claims, 23 Drawing Sheets

FIG. 2

PRODUCTION PLAN INFORMATION    151

| WORKPIECE ID | PRODUCTION QUANTITY [per month] | | | | | |
|---|---|---|---|---|---|---|
| | January | February | March | April | May | June |
| 1 | 300 | 500 | 300 | 800 | 700 | 400 |
| 2 | 500 | 500 | 200 | 500 | 400 | 200 |
| 3 | 300 | 300 | 200 | 700 | 500 | 600 |
| 4 | 500 | 300 | 600 | 500 | 400 | 200 |
| 5 | 600 | 300 | 700 | 400 | 500 | 500 |

FIG. 4

WORK TIME INFORMATION

| WORKPIECE ID | PROCESSING TIME [min] | | | WORKPIECE ATTACHMENT TIME [min] | | WORKPIECE REMOVAL TIME [min] | | CHUCK JAW EXCHANGE TIME [min] | | HAND EXCHANGE TIME [min] | |
|---|---|---|---|---|---|---|---|---|---|---|---|
| | 3000RPM | 4000RPM | 5000RPM | Human | Robot | Human | Robot | Human | Robot | Human | Robot |
| 1 | 132 | 110 | 88 | 1.6 | 2 | 1.2 | 1.5 | 15 | 30 | 0 | 2 |
| 2 | 144 | 120 | 96 | 1.6 | 2 | 1.2 | 1.5 | 15 | 30 | 0 | 2 |
| 3 | 156 | 130 | 104 | 1.6 | 2 | 1.2 | 1.5 | 15 | 30 | 0 | 2 |
| 4 | 168 | 140 | 112 | 1.6 | 2 | 1.2 | 1.5 | 15 | 30 | 0 | 2 |
| 5 | 180 | 150 | 120 | 1.6 | 2 | 1.2 | 1.5 | 15 | 30 | 0 | 2 |

RESOURCE CANDIDATE INFORMATION

| ID | NAME | RESOURCE CLASS. | WORK SPD. | PURCHASE PRICE [k¥] | EXT. HOR. W [m] | EXT. VER. W [m] | WT. [kg] | MIN LEN [m] | MAX LEN [m] | MIN DIA. [m] | MAX DIA. [m] | MAX WT. [kg] | MAX REAC H [m] | MAX TRAVEL SPD. [m/s] |
|---|---|---|---|---|---|---|---|---|---|---|---|---|---|---|
| 1001 | Machine1 | Main | 4000RPM | 50000 | 6.1 | 3 | 2000 | 0 | 2 | 0 | 0.65 | 500 | - | - |
| 1002 | Machine2 | Main | 3000RPM | 60000 | 8 | 3.2 | 2200 | 0 | 2 | 0 | 0.83 | 500 | - | - |
| 1003 | Machine3 | Main | 3000RPM | 70000 | 9.1 | 3.2 | 2600 | 0 | 3 | 0 | 0.83 | 600 | - | - |
| 1004 | Machine4 | Main | 3000RPM | 60000 | 5.5 | 2.5 | 1800 | 0 | 2.15 | 0 | 0.48 | 600 | - | - |
| 1101 | Human | Main | Human | 0 | 0 | 0 | 70 | - | - | - | - | 999 | 99.0 | 3 |
| 1201 | Robot1 | Main | Robot | 60000 | 2 | 2 | 1000 | - | - | - | - | 200 | 2.9 | 1 |
| 1202 | Robot2 | Main | Robot | 7500 | 2 | 2 | 700 | - | - | - | - | 75 | 2.9 | 1 |
| 1203 | Robot3 | Main | Robot | 5000 | 1.5 | 1.5 | 600 | - | - | - | - | 50 | 2.7 | 1 |
| 1204 | Robot4 | Main | Robot | 2500 | 1.5 | 1.5 | 500 | - | - | - | - | 25 | 2.7 | 1 |
| 2001 | Hand1 | Ancillary | - | 10 | - | - | 10 | - | - | 0.01 | 0.1 | - | - | - |
| 2002 | Hand2 | Ancillary | - | 20 | - | - | 20 | - | - | 0.04 | 0.15 | - | - | - |
| 2003 | Hand3 | Ancillary | - | 30 | - | - | 30 | - | - | 0.07 | 0.2 | - | - | - |
| 2101 | Grasping Position Adjustment Device A | Ancillary | - | 50 | 1 | 0.2 | - | 0 | 0.5 | - | - | - | - | - |

FIG. 5B

RESOURCE CANDIDATE INFORMATION

| ID | NAME | RESOURCE CLASS. | WORK SPD. | PURCHASE PRICE [k¥] | EXT. HOR. W [m] | EXT. VER. W [m] | WT. [kg] | MIN LEN. [m] | MAX LEN. [m] | MIN DIA. [m] | MAX DIA. [m] | MAX WT. [kg] | MAX REACH [m] | TRAVEL SPD. [m/s] |
|---|---|---|---|---|---|---|---|---|---|---|---|---|---|---|
| 2102 | Grasping Position Adjustment Device B | Ancillary | ⋯ | 70 | 1.5 | 0.2 | ⋯ | ⋯ | ⋯ | ⋯ | ⋯ | ⋯ | ⋯ | ⋯ |
| 2201 | Workpiece Stand A | Ancillary | ⋯ | 10 | 1 | 1 | ⋯ | 0 | 0.7 | ⋯ | ⋯ | ⋯ | ⋯ | ⋯ |
| 2202 | Workpiece Stand B | Ancillary | ⋯ | 20 | 1.5 | 1.5 | ⋯ | 0 | 0.5 | ⋯ | ⋯ | ⋯ | ⋯ | ⋯ |
| 2301 | Hand Stand A | Ancillary | ⋯ | 10 | 0.5 | 0.5 | ⋯ | 0 | 0.7 | ⋯ | ⋯ | ⋯ | ⋯ | ⋯ |
| 2302 | Hand Stand B | Ancillary | ⋯ | 20 | 1 | 1 | ⋯ | ⋯ | ⋯ | ⋯ | ⋯ | ⋯ | ⋯ | ⋯ |
| 2401 | Hand Jaw A | Ancillary | ⋯ | 10 | ⋯ | ⋯ | 5 | ⋯ | ⋯ | ⋯ | ⋯ | ⋯ | ⋯ | ⋯ |
| 2402 | Hand Jaw B | Ancillary | ⋯ | 20 | ⋯ | ⋯ | 7 | ⋯ | ⋯ | ⋯ | ⋯ | ⋯ | ⋯ | ⋯ |
| 2501 | Hand Jaw Stand A | Ancillary | ⋯ | 10 | 0.2 | 0.2 | ⋯ | ⋯ | ⋯ | ⋯ | ⋯ | ⋯ | ⋯ | ⋯ |
| 2502 | Hand Jaw Stand B | Ancillary | ⋯ | 20 | 0.4 | 0.4 | ⋯ | ⋯ | ⋯ | ⋯ | ⋯ | ⋯ | ⋯ | ⋯ |
| 2601 | Chuck Jaw A | Ancillary | ⋯ | 10 | ⋯ | ⋯ | 1 | ⋯ | ⋯ | ⋯ | ⋯ | ⋯ | ⋯ | ⋯ |
| 2602 | Chuck Jaw B | Ancillary | ⋯ | 20 | ⋯ | ⋯ | 2 | ⋯ | ⋯ | ⋯ | ⋯ | ⋯ | ⋯ | ⋯ |
| 2701 | Chuck Jaw Stand A | Ancillary | ⋯ | 10 | 0.2 | 0.2 | ⋯ | ⋯ | ⋯ | ⋯ | ⋯ | ⋯ | ⋯ | ⋯ |
| 2702 | Chuck Jaw Stand B | Ancillary | ⋯ | 20 | 0.2 | 0.2 | ⋯ | ⋯ | ⋯ | ⋯ | ⋯ | ⋯ | ⋯ | ⋯ |

FIG. 6

PRODUCTION CONDITION INFORMATION

155

| PRODUCTION CONDITION_ID | ITEM | SET VALUE |
|---|---|---|
| 1 | Upper Limit of The Number of The Cell | 10 |
| 2 | Utilization Rate of the Processing Machine [%] | 70 |
| 3 | Utilization Rate of the Setup Resource [%] | 100 |
| 4 | Horizontal Cell Width Upper Limit [m] | 10 |
| 5 | Vertical Cell Width Upper Limit [m] | 10 |
| 6 | Labor Cost Unit Price [¥/Hour] | 4000 |
| 7 | Depreciation Period [Production Period] | 60 |
| 8 | Upper Limit of the Total Purchase Price [k¥] | 80000 |
| 9 | Production Period [Hour/Production Period] | 4800 |

155a     155b     155c

FIG. 7A
WORK ORDER INFORMATION

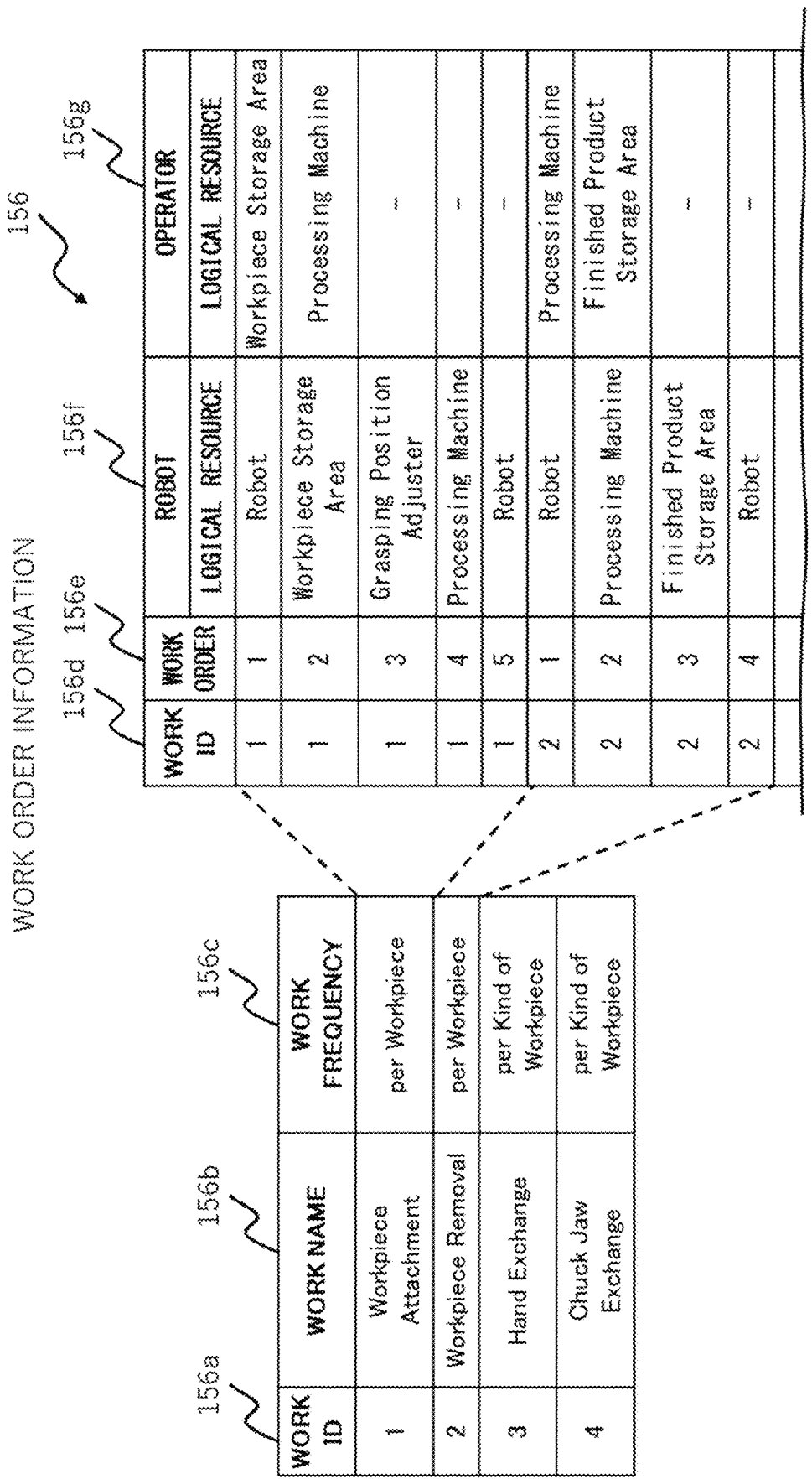

| WORK ID | WORK NAME | WORK FREQUENCY |
|---|---|---|
| 1 | Workpiece Attachment | per Workpiece |
| 2 | Workpiece Removal | per Workpiece |
| 3 | Hand Exchange | per Kind of Workpiece |
| 4 | Chuck Jaw Exchange | per Kind of Workpiece |

| WORK ID | WORK ORDER | ROBOT LOGICAL RESOURCE | OPERATOR LOGICAL RESOURCE |
|---|---|---|---|
| 1 | 1 | Workpiece Storage Area | Workpiece Storage Area |
| 1 | 2 | Robot | Processing Machine |
| 1 | 3 | Grasping Position Adjuster | -- |
| 1 | 4 | Processing Machine | -- |
| 1 | 5 | Robot | Processing Machine |
| 2 | 1 | Robot | Processing Machine |
| 2 | 2 | Processing Machine | Finished Product Storage Area |
| 2 | 3 | Finished Product Storage Area | -- |
| 2 | 4 | Robot | -- |

FIG. 8
RESOURCE CONFIGURATION INFORMATION

| CELL ID | ARRANGED RESOURCE ID | LOGICAL RESOURCE | RESOURCE MODEL NAME |
|---|---|---|---|
| 1 | 1 | Processing Machine 1 | 'Machine1' |
| 1 | 2 | Chuck Jaw Storage Area 1 | 'Chuck Jaw Stand A' |
| 1 | 3 | Chuck Jaw Storage Area 2 | 'Chuck Jaw Stand A' |
| 1 | 4 | Workpiece Storage Area | 'Workpiece Stand A' |
| 1 | 5 | Finished Product Storage Area | 'Workpiece Stand A' |
| 1 | 6 | Grasping Position Adjuster | 'Grasping Position Adjuster A' |
| 1 | 7 | Robot | 'Robot1' |
| 1 | 8 | Hand Jaw Storage Area 1 | 'Hand Jaw Stand A' |
| 1 | 9 | Hand Jaw Storage Area 2 | 'Hand Jaw Stand A' |
| 1 | 10 | Hand Storage Area 1 | 'Hand Stand A' |
| 1 | 11 | Hand Storage Area 2 | 'Hand Stand A' |
| 2 | 1 | ... | ... |
| 2 | 2 | ... | ... |
| ... | ... | | |

×N

FIG. 9
WORK ALLOCATION INFORMATION

| PRODUCTION MONTH | CELL ID | PROCESSING MACHINE ID | WORKPIECE ID | PRODUCTION QUANTITY |
|---|---|---|---|---|
| 1 | 1 | 1 | 1 | 100 |
| 1 | 1 | 1 | 2 | 136 |
| 1 | 1 | 2 | 2 | 94 |
| 1 | 2 | 2 | 3 | 110 |
| 1 | 2 | 1 | 4 | 130 |
| 1 | 2 | 2 | 5 | 150 |
| 2 | 1 | 1 | 3 | 150 |
| 2 | 1 | 2 | 1 | 120 |
| 2 | 2 | 2 | 2 | 100 |
| 2 | 2 | 1 | 4 | 100 |
| 2 | 2 | 2 | 5 | 200 |
| ... | ... | ... | ... | ... |
| ... | ... | ... | ... | ... |
| ... | ... | ... | ... | ... |

FIG. 10
COST INFORMATION

| CELL ID | ARRANGED RESOURCE ID | PURCHASE PRICE (k¥) | DEPRECIATION COST (k¥/PRODUCTION PERIOD) | LABOR COST (k¥/PRODUCTION PERIOD) | OPERATION COST (k¥/PRODUCTION PERIOD) |
|---|---|---|---|---|---|
| 1 | 1 | 50000 | 833.33 | 0 | 833.33 |
| 1 | 2 | 10 | 0.17 | 0 | 0.17 |
| 1 | 3 | 10 | 0.17 | 0 | 0.17 |
| 1 | 4 | 100 | 1.67 | 0 | 1.67 |
| 1 | 5 | 10 | 0.17 | 0 | 0.17 |
| 1 | 6 | 10 | 0.17 | 0 | 0.17 |
| 1 | 7 | 50 | 0.83 | 0 | 0.83 |
| 1 | 8 | 60000 | 1000.00 | 0 | 1000.00 |
| 1 | 9 | 10 | 0.17 | 0 | 0.17 |
| 1 | 10 | 10 | 0.17 | 0 | 0.17 |
| 1 | 11 | 10 | 0.17 | 0 | 0.17 |
| 1 | 12 | 10 | 0.17 | 0 | 0.17 |
| 2 | 1 | ... | ... | ... | ... |
| 2 | 2 | ... | ... | ... | ... |
| ... | ... | ... | ... | ... | ... |

FIG. 11A
LAYOUT INFORMATION

| CELL ID | ARRANGED RESOURCE ID | RESOURCE MODEL NAME | CTR. X COORD. (m) | CTR. Y COORD. (m) | ORIENT. | HOR. W. (m) | VER. W. (m) | U. R. V X-COORD. (m) | U. R. V Y-COORD. (m) |
|---|---|---|---|---|---|---|---|---|---|
| 1 | 1 | Machine 1 | 4.5 | 9 | Lateral | 6.1 | 3.0 | 7.55 | 10.5 |
| 1 | 2 | Hand Jaw Stand A | 8 | 4.5 | Vertical | 0.2 | 0.2 | 8.1 | 4.6 |
| 1 | 3 | Hand Jaw Stand A | 8 | 4 | Vertical | 0.2 | 0.2 | 8.1 | 4.1 |
| 1 | 4 | Workpiece Stand A | 5.5 | 1 | Lateral | 1.0 | 1.0 | 6.0 | 1.5 |
| 1 | 5 | Workpiece Stand A | 4 | 1 | Lateral | 1.0 | 1.0 | 4.5 | 1.5 |
| 1 | 6 | Grasping Position Adjuster A | 7 | 7 | Vertical | 1.0 | 0.2 | 7.5 | 7.1 |
| 1 | 7 | Robot 1 | 4.5 | 4.5 | Vertical | 2.0 | 2.0 | 5.5 | 5.5 |

FIG. 11B
LAYOUT INFORMATION

| CELL ID | ARRANGED RESOURCE ID | RESOURCE MODEL NAME | CTR. X COORD. (m) | CTR. Y COORD. (m) | ORIENT. | HOR. W. (m) | VER. W. (m) | U.R.V X-COORD. (m) | U.R.V Y-COORD. (m) |
|---|---|---|---|---|---|---|---|---|---|
| 1 | 8 | Hand Jaw Stand A | 3 | 5 | Vertical | 0.2 | 0.2 | 3.1 | 5.1 |
| 1 | 9 | Hand Jaw Stand A | 3 | 4 | Vertical | 0.2 | 0.2 | 3.1 | 4.1 |
| 1 | 10 | Hand Stand A | 1.5 | 5 | Vertical | 0.5 | 0.5 | 1.75 | 5.25 |
| 1 | 11 | Hand Stand A | 1.5 | 4 | Vertical | 0.5 | 0.5 | 1.75 | 4.25 |
| 2 | 1 | ... | ... | ... | ... | ... | ... | ... | ... |
| 2 | 2 | ... | ... | ... | ... | ... | ... | ... | ... |
| ... | ... | ... | ... | ... | ... | ... | ... | ... | ... |

SETUP TIME INFORMATION 161

| PRODUCTION MONTH | CELL ID | WORK ID | WORK NAME | UNIT WORK TIME [min/times] | NUM. of OPS. [times] | MIN. SETUP TIME [min] | UNIT TRAVEL DIST. [m/times] | TRAVEL SPD. [m/s] | TRAVEL TIME [min] | SETUP TIME [min] |
|---|---|---|---|---|---|---|---|---|---|---|
| January | 1 | 1 | Workpiece Attachment | 2 | 440 | 880 | 18 | 1 | 132.0 | 1012.0 |
| January | 1 | 2 | Workpiece Removal | 1.5 | 440 | 660 | 16 | 1 | 117.3 | 777.7 |
| January | 1 | 3 | Hand Exchange | 30 | 4 | 120 | 7 | 1 | 0.5 | 120.5 |
| January | 1 | 4 | Chuck Jaw Exchange | 2 | 4 | 8 | 21 | 1 | 1.4 | 9.4 |
| January | 2 | 1 | Workpiece Attachment | 2 | 280 | 560 | 18 | 1 | 84.0 | 644.0 |
| January | 2 | 2 | Workpiece Removal | 1.5 | 280 | 420 | 16 | 1 | 74.7 | 494.7 |
| January | 2 | 3 | Hand Exchange | 30 | 2 | 60 | 7 | 1 | 0.2 | 60.2 |
| January | 2 | 4 | Chuck Jaw Exchange | 2 | 2 | 4 | 21 | 1 | 0.7 | 4.7 |
| February | 1 | 1 | Workpiece Attachment | 2 | 370 | 740 | 18 | 1 | 111.0 | 851.0 |
| February | 1 | 2 | Workpiece Removal | 1.5 | 370 | 555 | 16 | 1 | 98.7 | 653.7 |
| February | 1 | 3 | Hand Exchange | 30 | 3 | 90 | 7 | 1 | 0.4 | 90.4 |
| February | 1 | 4 | Chuck Jaw Exchange | 2 | 3 | 6 | 21 | 1 | 1.1 | 7.1 |
| February | 2 | 1 | Workpiece Attachment | ... | ... | ... | ... | ... | ... | ... |
| February | 2 | 2 | Workpiece Removal | ... | ... | ... | ... | ... | ... | ... |
| February | 2 | 3 | Hand Exchange | ... | ... | ... | ... | ... | ... | ... |

FIG. 18A

CANDIDATE DISPLAY SCREEN

■ Summary of the Solution (Resource Configuration Candidate Information, Layout Candidate Information) — 500

| Resource Configuration ID | Total Operating Costs [M¥] | Resource Configuration Candidate Information | | Layout Information | | |
|---|---|---|---|---|---|---|
| | | Main resource | Ancillary Resource | Layout ID and Setup Time [hours/month] (sorted in order of shortest setup time) | | |
| 1 | 50 | Processing Machine A, Robot A | Chuck Jaw Stand A x 2, Workpiece Storage Area A x 2, Gripping Position Adjuster A x 1, Hand Jaw Storage Area A x 2, Hand Storage A x 1, Hand A x 1, Hand B x 1, Hand Jaw A x 1, Hand Jaw B x 1, Chuck Jaw A x 1, Chuck Jaw B x 1 | ☑1-1   27 | ☐1-2   30 | ☐1-3   38 |
| 2 | 56 | Processing Machine A, Robot B | Chuck Jaw Stand A x 2, Workpiece Storage Area A x 2, Gripping Position Adjuster A x 1, Hand Jaw Storage Area B x 2, Hand Storage Area B x 2, Hand B x 2, Hand Jaw B x 2, Chuck Jaw A x 2 | ☑2-1   27 | ☐2-2   27 | ☐2-3   35 |

510

PRODUCTION LINE DESIGN APPARATUS, PRODUCTION LINE DESIGN SYSTEM, AND PRODUCTION LINE DESIGN METHOD

CROSS-REFERENCE TO RELATED APPLICATION

This application is based upon and claims the benefit of the prior Japanese Patent Application No. 2021-172081, filed on Oct. 21, 2021, the entire contents of which are incorporated herein by reference.

TECHNICAL FIELD

The present invention relates to a production line design apparatus, a production line design system, and a production line design method.

BACKGROUND ART

Patent literature 1 (International Publication Pamphlet No. 2019/021938) discloses "a design information generating apparatus comprising: a required operation information generating unit which, on the basis of assembly information, work process information and geometrical information for the product, generates required operation information which indicates the operation performed on a workpiece to achieve a target state; a work constraint generating unit which determines, as a constraint condition, at least any one of the position of the applicable component and the acting force on the basis of the geometrical information, the assembly information and the work process information and generates work constraint information; and a work performer selection unit which, on the basis of the required operation information, the work constraint information and work performer information, selects a work performer satisfying both constraining conditions of the work constraint information and required operation capacity to achieve the required operation information, and generates process design information which includes information about the selected work performer".

SUMMARY

In the technique described in the patent literature 1, a work entity is selected that satisfies both a necessary capability information for executing the desired work and a given constraint condition information. Here, the work entity is a main resource that executes the concerned process (hereinafter referred to as "main resource"). On the other hand, in order to accurately calculate the estimated work time, it is necessary to accurately calculate the time for setup in addition to the work time performed by the work entities. The above technology does not mention such a point, and the best design result cannot be obtained with good accuracy.

An object of the present invention is to plan a production line design that is simple, accurate, and cost-effective to operate.

The present application employs the means described in the claims, for example, to solve the above problems. The present invention includes several means to solve the above issues and, the example of which is the production line design apparatus including: a memory unit configured to store resource configuration information defining production resources constituting a production line to be designed, resource arrangement constraint information defining an arrangement constraint on the production resources, a production condition to be satisfied by the production line, work allocation information including a workpiece allocated to the production resources and a number of the workpiece, work order information including the production resources used in setup works of the production line and an order of the setup works, and resource candidate information defining a specification of the production resources; a layout generation unit configured to generate a plurality of layout candidates for each of the resource configuration information, where the layout candidate satisfies the arrangement constraint and the production condition; and a setup time calculation unit configured to calculate a setup time for each layout candidate using the resource configuration information, the work arrangement information, the work order information, and the resource candidate information.

According to the present invention, it can be provided a technique for planning production line designs that are simple, accurate, and cost-effective for operation.

Objects, configurations, and effects other than those described above will be clarified by the following description of the embodiments.

BRIEF DESCRIPTION OF DRAWINGS

FIG. 2 illustrates an example of a data structure of production plan information;

FIG. 4 illustrates an example of a data structure of work time information;

FIGS. 5A and 5B illustrate an example of a data structure of resource candidate information;

FIG. 6 illustrates an example of a data structure of production condition information;

FIGS. 7A and 7B illustrate an example of a data structure of work order information;

FIG. 8 illustrates an example of a data structure of resource configuration information;

FIG. 9 illustrates an example of a data structure of work allocation information;

FIG. 10 illustrates an example of a data structure of cost information;

FIGS. 11A and 11B illustrate an example of a data structure of layout information;

FIG. 12 illustrates an example of a data structure of setup time information;

FIGS. 18A and 18B illustrate an example of a candidate display screen; and

DESCRIPTION OF EMBODIMENTS

Figure 1:
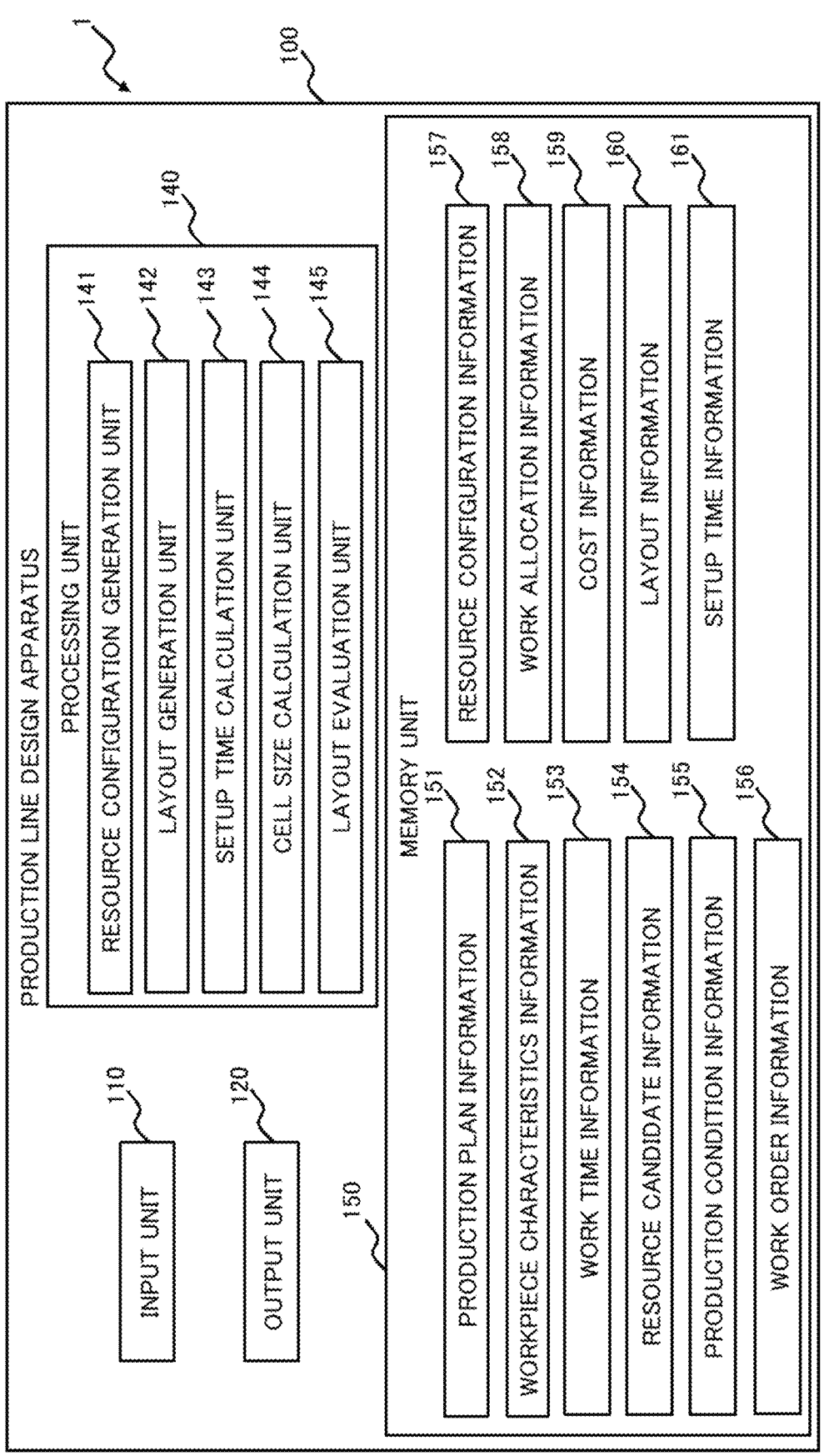
FIG. 1 illustrates an example of a configuration of production line design system.

In the following embodiments, when necessary for convenience, the description is divided into several sections or embodiments. However, they are not unrelated to each other, unless otherwise expressly stated, and one is related to some or all of the other by variations, details, supplementary explanations and like.

In the following embodiments, when reference is made to the number of elements and the like (including number, numerical value, quantity, range and the like), they are not limited to some specific number, and may be more or less than the specific number, except when specifically indicated and when clearly limited to the specific number in principle.

Furthermore, it goes without saying that in the following embodiments, the components (including elemental steps and the like) are not necessarily essential, except when specifically indicated and when clearly considered essential in principle.

Similarly, in the following embodiments, when reference is made to the shape, positional relationship, etc. of a constituent element and the like, it includes those that substantially approximate or resemble the shape thereof, except in cases where it is specifically indicated or where it is clearly considered not to be so in principle. This is also the case for the above numerical values and ranges.

In all figures used to explain the embodiments, identical elements are, in principle, marked with identical reference numerals, and repeated descriptions thereof are omitted. However, even identical elements may be given different reference numerals or names when there is a high risk of confusion if they share the same names as those used before the change due to environmental changes or other reasons. In the following, description will be given of each embodiment of the invention while referring to the drawings.

Ancillary resources required by main resources (including, for example, processing machines, welding machines, and robots that attach workpieces to them or change hands (also called gripping portions)) to execute a process are called ancillary resources. In order to obtain an accurate and operationally efficient design in line designing, it is necessary to design ancillary resources as well, and to generate a layout that includes not only the main resources but also the ancillary resources. This is because the setup time varies depending on the layout. For example, ancillary resources include jigs and hand stockers required for the processing machines to perform machining operations, or hands and hand stockers required for the robot to perform setup works.

Generally, it is expected that the work time will be shorter when main resources with high capability are used, but since investment and operation costs becomes higher for main resources with higher capability, it is necessary to compare the operation costs of the entire process and perform process planning. In order to accurately calculate operation costs, it is reasonable to design a specific line including ancillary resources and evaluate the design.

Particularly, in recent years, there has been an increasing demand for line designs that combine processing machines and robots to operate autonomously, and the need to reduce operation costs is also increasing. That is, by generating an efficient layout that includes not only main resources but also ancillary resources, it is possible to improve the accuracy of the estimation of the setup time, which makes it possible to plan the production line designs with lower operation costs.

The following embodiment covers the problem of designing a resource configuration and layout for a production line comprising a processing machine for cutting the workpieces, and operators, robots, and the like that load and unload the workpieces to and from the processing machine before and after the machining process. The work processes of the production line covered by this invention may be not only machining but also assembly, welding, and the like.

The following is an example of the resources that constitute such a production line. First, there is a processing machine, which is the main resource that executes the machining process. Then, there are chuck jaws and chuck jaw storage areas, etc., as the ancillary resources for the processing machine. In addition, there are operators and robots as the main resources that execute setup works such as workpiece attachment and chuck jaw exchange, which are necessary before and after the machining process. In addition, there are hands and hand storage areas, etc., as the ancillary resources for the robot.

A production line consists of one or more cells. Each cell consists of mandatory elements, which is one or more processing machines that perform machining processes, and one robot or one operator that performs setup work for the machining process. The robot as the main resource to perform the setup work requires one or more hands to grasp the workpiece. When two or more hands are required, one or more hand storage areas are needed to temporarily store the unused hand. Such relationships between main resources, between main resources and ancillary resources, and between ancillary resources can be defined using mathematical formulas as resource configuration constraints. The constraints on the arrangement between the resources on the layout can be defined as resource arrangement constraints.

In the resource configuration design, one or more combinations of main resources and ancillary resources that constitute the production line of the target factory are determined from among various types of resource candidates. In the subsequent layout design, the positions and orientations of the resources are determined for the resource configurations determined in the resource configuration design. Generally, the use of a main resource with higher capability allows workpieces with larger dimensions to be completed in less time, but requires a larger footprint and a higher purchase price.

The following embodiment describes a production line design system that determines a resource configuration that satisfies the required production quantity and reduces operation costs, and determines a layout that also reduces setup time, by considering the trade-off relationship among various variables such as work capacity, work time, space, and cost. Note that the operational cost is defined as the sum of equipment depreciation cost and labor cost over some period that is set in advance.

In the following embodiment, "input unit" and "output unit" may be one or more interface devices. The one or more interface devices may be at least one of the following:

One or more I/O (Input/Output) interface devices. The I/O interface device is an interface device for at least one of an I/O device and a remote display computer. The I/O interface device for the display computer may be a communication interface device. At least one of the I/O devices may be a user interface device, e.g., an input device such as a keyboard and pointing device, or an output device such as a display device; and One or more communication interface devices. The one or more communication interface devices may be one or more similar kind of communication interface devices (e.g., one or more NICs (Network Interface Components)) or two or more similar kind of communication interface devices (e.g., NIC and HBA (Host Bus Adapter).

In the following description, "memory" is one or more memory devices that are examples of one or more storage devices, which can typically be a main memory device. At least one memory device in the memory may be a volatile memory device or a non-volatile memory device.

In the following description, "external memory device" may be one or more persistent memory devices, which are examples of one or more memory devices. A persistent storage device may typically be a non-volatile storage device (e.g., an auxiliary storage device), specifically, for example, a HDD (Hard Disk Drive), SSD (Solid State Drive), NVME (Non-Volatile Memory Express) drives, or SCM (Storage Class Memory) drives.

In the following description, "memory unit" or "external storage device" can be memory or both of memory and persistent storage device.

In the following description, a "processing unit" or "processor" may be one or more processor devices. At least one processor device may typically be a CPU (Central Processing Unit), but may also be another type of processor device, such as a GPU (Graphics Processing Unit). At least one processor device may be single-core or multi-core. At least one processor device may be a processor core. At least one processor device may be a circuit that is a collection of gate arrays (e.g., an FPGA (Field-Processing Gate Array)) with a hardware description language that performs some or all of the processing, a CPLD (Complex Programmable Logic Device) or ASIC (Application Specific Integrated Circuit), which are processor devices in the broad sense.

In the following description, a "production line design system" may be a system consisting of one or more physical computers, or a system realized on a group of physical computing resources (e.g., a cloud computing system). The "displaying" of display information by the production line design system may be the displaying of display information on a display device possessed by the computer, or the computer may transmit display information to the computer for display (in the latter case, display information is displayed by the computer for display).

FIG. 1 illustrates an example configuration of a production line design system. The production line design system 1 includes a production line design apparatus 100. The production line design system 1 is provided at a manufacturing site (area) or at a facility outside the manufacturing site. The production line design system 1 includes a group of devices according to the use environment, such as display computers, etc., which are communicatively connected via an unillustrated network.

Although not shown in the figure, the network is, for example, a LAN (Local Area Network), WAN (Wide Area Network), VPN (Virtual Private Network), a communication network that uses general public lines such as the internet in whole or in part, a cell phone communication network, etc., or a composite network of any of these. Note that network may be a wireless communication network such as Wi-Fi (registered trademark) or 5G (Generation).

The production line design apparatus 100 includes an input unit 110, an output unit 120, a processing unit 140, and a memory unit 150. The memory unit 150 stores production plan information 151, workpiece characteristic information 152, work time information 153, resource candidate information 154, production condition information 155, work order information 156, resource configuration information 157, work allocation information 158, cost information 159, layout information 160, and setup time information 161. The processing unit 140 includes a resource configuration generation unit 141, a layout generation unit 142, a setup time calculation unit 143, a cell size calculation unit 144, and a layout evaluation unit 145.

FIG. 2 illustrates an example of the data structure of production plan information. The production plan information 151 is information that defines the production period and production quantity of the workpieces. The production plan information 151 is stored by associating a workpiece ID 151a with a production amount 151b for each production period. The production period may be in units of years, months, or weeks. In addition, there may only be one or more production periods.

Figure 3:
FIG. 3 illustrates an example of a data structure of workpiece characteristic information.

FIG. 3 illustrates an example of the data structure of the workpiece characteristic information. The workpiece characteristic information 152 is information that defines the dimensions or shape of a workpiece. The workpiece characteristic information 152 includes a workpiece ID 152a of the workpiece to be produced. The workpiece ID 152a is associated with a diameter 152b, an axis length 152c, and a weight 152d of each workpiece in the workpiece characteristic information 152. The workpiece characteristic information 152 does not limited to the above. The workpiece characteristic information 152 may include information on other characteristics such as material, shape, required accuracy, existence of drilled holes, and experience of hardening. That is, by using the workpiece characteristic information 152, it is possible to make decisions to narrow down the candidates of main resources and ancillary resources that are capable of machining and setup work for the workpiece.

FIG. 4 illustrates an example of the data structure of the work time information. The work time information 153 is information that defines the work time for each workpiece. The work time information 153 includes the workpiece ID 153a. The workpiece ID 153 a is associated with a processing time 153b for each workpiece, a workpiece attachment time 153c, a workpiece removal time 153d, a chuck jaw exchange time 153e, and a hand exchange time 153f. For example, when workpiece ID="1" is processed at a work speed of 3000 RPM (Revolutions Per Minute), the processing time 153b is 132 minutes per piece. In addition, when workpiece ID="2" is attached by Robot, the workpiece attachment time 153c is "2" minutes per workpiece.

The work time information 153 may also include work time information such as workpiece cleaning time, hand jaw exchange time, etc., depending on the target production line. The processing time 153b in the work time information 153 can be used to generate the resource configuration information 157 and the work allocation information 158 that satisfy the production quantity specified in the production plan information 151.

Each work time may be calculated using the actual work results of the same work in the past, or when there are no actual results of the same work, an analogous value from similar work may be used. Alternatively, the work time may be estimated by simulation or other method. By using the value estimated by analogy or simulation for the work time, it is possible to design a production line for a workpiece that has no past performance. Each work time in the work time information 153 may be updated as needed based on actual work results.

FIGS. 5A and 5B illustrate an example of the data structure of the resource candidate information. The resource candidate information 154 is information that defines the specifications of production resources. The resource candidate information 154 includes a name 154b, a resource classification 154c indicating whether it is a main resource or an ancillary resource, a work speed 154d, a purchase price 154e, an external horizontal width 154f, an external vertical width 154g, a weight 154h, a lower limit of workpiece axis length 154j, an upper limit of workpiece axis length 154k, a lower limit of workpiece diameter 154m, an upper limit of workpiece diameter 154p, an upper limit of workpiece weight 154r, an upper limit of reach 154s, a travel speed 154t, and other specifications, which are associated with each other for each candidate resource of the resource ID 154a.

Here, the resource candidate information 154 may include removal cost information. By using the removal cost information, when an existing resource is removed and a new resource is placed, or when there is a possibility that a resource is removed in the future, the cost information can be calculated considering the removal cost.

The resource candidate information 154 may include information on the external height. By using the external height information, when there is a space constraint in the height direction of the plant, a resource configuration candidate that satisfies the height constraint can be generated.

FIG. 6 illustrates an example of the data structure of the production condition information. The production condition information 155 is information that defines the production conditions that must be satisfied by the production line to be designed. The production condition information 155 includes items 155b and 155c which are associated with each other for each production condition ID 155a. For example, in the condition where the production condition ID 155a is "2", the "Utilization Rate of the Processing Machine" in the item 155b is set to "70"% as indicated by the set value 155c. Here, for the items "Horizontal Cell Width Upper Limit" and "Vertical Cell Width Upper Limit" included in item 155b, the set value 155c may be set individually for each multiple cells. In addition, the production conditions include at least a constraint on the area occupied by the cell.

For the item "Depreciation Period" included in item 155b, the set value 155c may be set for each resource individually. By setting multiple patterns of production conditions in the production condition information 155, the optimal resource configuration information 157 and layout information 160 can be selected for each pattern, making it easier to compare the optimal design solution according to detailed production conditions.

In addition, "Cell Occupancy Area Limit" may be provided as the item 155b in the production condition information 155. When a rectangle that encompasses the resource is deemed as the cell, the cell occupancy area can be defined as an area of the rectangle, i.e., the product of the horizontal cell width and the vertical cell width. By defining the cell occupancy area, even when there is constraint on the area to be designed in a factory, it becomes possible to generate layout information 160 that satisfies the constraint.

Figure 7B:
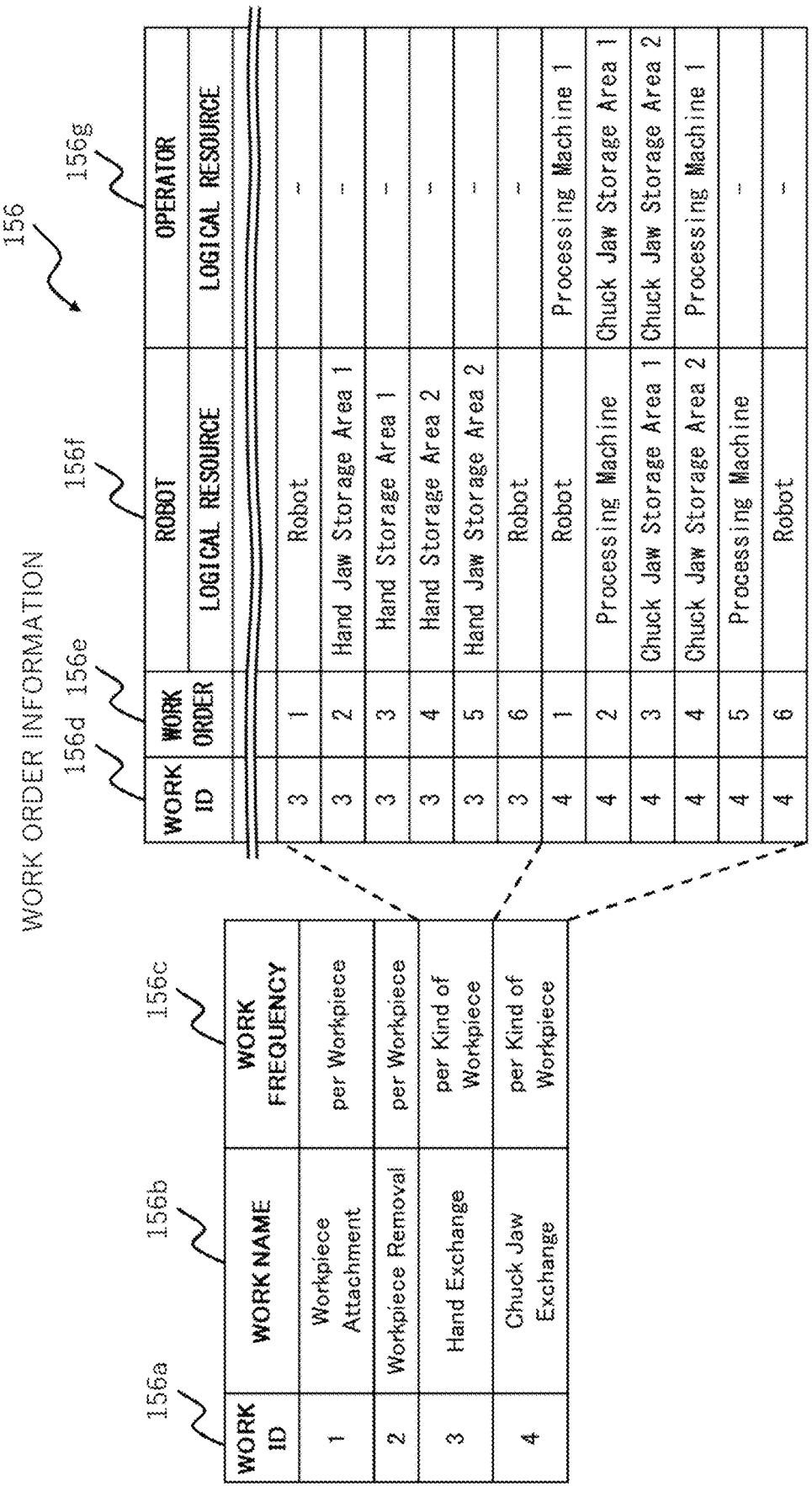

FIGS. 7A and 7B illustrate an example of the data structure of the work order information. The work order information 156 is information that defines the production resources used in the setup work of the production line and the order of the setup work. The work order information 156 includes a work name 156b, a work frequency 156c at which the work is needed, a work order 156e according to which the work is constructed, a logical resource 156f used by the robot in the work, and a logical resource 156f used by the operator, which are associated with each other for each work ID 156a. Note that the logical resource is a classification for convenience of logically identifying resource category. The entity of the logical resource is assigned with one of the resource models (also called a physical resource).

By using the work order information 156, it is possible to logically specify the order of resource use, so that the route and travel distance of setup work can be calculated according to the layout of the physical resources assigned to the logical resources. Here, information such as hand jaw exchange work and workpiece cleaning work may be defined as the work. In addition, workpiece attachment work may be defined by multiple patterns, which can be selected according to the resource configuration.

FIG. 8 illustrates an example of the data structure of the resource configuration information. The resource configuration information 157 is information that defines production resources that constitute the production line to be designed. The resource configuration information 157 includes an arranged resource ID 157b that identifies the ID of the resource to be arranged in the cell, a logical resource 157c of the resource to be arranged, and a resource model name 157d, which are associated with each other for each of a cell ID 157a.

FIG. 9 illustrates an example of the data structure of the work allocation information. The work allocation information 158 is information that defines workpieces allocated to production resources and the quantity of the workpieces. The work allocation information 158 includes a processing machine ID 158c, a cell ID 158b in which the processing machine is allocated, a workpiece ID 158d of the workpiece allocated to the processing machine during a certain production period (production month 158a), and a production quantity of the workpiece, which are associated with each other.

FIG. 10 illustrates an example of the data structure of the cost information. The cost information 159 includes an arranged resource ID 159b which shows resource ID of the resource arranged in the cell identified by cell ID 159a, a purchase price 159c of the resource, a depreciation cost 159d, a labor cost 159e, and an operation cost 159f which is calculated as the sum of the depreciation cost and the labor cost, which are associated with each other.

FIGS. 11A and 11B illustrate an example of the data structure of the layout information. Here, the layout is indicated by coordinates with the lower left corner of the cell as the origin, the right direction (horizontal direction) as the X direction, and the upper direction (vertical direction) orthogonal to the X direction as the Y direction when the cell is looked down from above. The layout information 160 includes an arranged resource ID 166b which indicates the resource ID of the resource arranged in the cell, a resource model name 160c, a center X coordinate 160d specifying the X coordinate of the center of the resource, a center Y coordinate 160e specifying the Y coordinate of the center of the resource, an orientation 160f of the resource, a horizontal width 160g of the resource specifying the horizontal width of the resource, a vertical width 160h of the resource specifying the vertical width of the resource, an upper right vertex X-coordinate 160j specifying the X-coordinate of the upper right vertex of the resource, and an upper right vertex Y-coordinate 160k specifying the Y-coordinate of the upper right vertex of the resource, which are associated with each other for each of a cell ID 160a of the target cell.

When considering the size of a cell, the smallest rectangle that contains all the resources to be arranged in the cell is considered, and the area of the rectangle is considered as an occupancy area of the cell. For the size of the cell whose cell ID is "1" in FIGS. 11A and 11B, "chuck jaw stand A" with the arranged resource ID 160b of "2" has the largest X-coordinate of the upper right vertex among all the arranged resources in the cell, so the horizontal width of the cell is "8.1". Similarly, among all the arranged resources in the cell, the one with the largest Y-coordinate of the upper right vertex is "Machine 1" whose arranged resource ID 160b is "1", so the vertical width of the cell is "10.5".

FIG. 12 illustrates an example of the data structure of the setup time information. The setup time information 161 includes work ID 161c of the setup work that occurs in the cell of a cell ID 161b in some production period (production month 161a), a work name 161d of the setup work, a unit work time 161e, the number of operations 161f that is the number of times the unit work is performed, a minimum setup time 161g needed for operating the number of operations, a unit travel distance 161h per operation, a travel speed 161j, a travel time 161k, and finally calculated setup time 161m, which are associated with each other.

Here, multiple patterns for calculating the number of operations may be defined in advance using the resource configuration information 157. For example, in the case of a resource with only one hand in the resource configuration, the hand exchange work does not exist, so the number of the hand exchange may be defined as zero. In this way, a comparison can be made between purchasing multiple inexpensive hands that can grip small-sized workpieces and purchasing only one hand that is more expensive but can grip a wider range of workpiece sizes, in terms of setup time.

Although not shown in the figure, the memory unit 150 stores a resource configuration constraint information defining a constraint condition on the configuration of the production resources by categorizing the production resources into main resources and ancillary resources, and a resource arrangement constraint information defining a constraint on the arrangement of the resources.

Returning to FIG. 1, the processing unit 140 includes a resource configuration generation unit 141, a layout generation unit 142, a setup time calculation unit 143, a cell size calculation unit 144, and a layout evaluation unit 145.

The resource configuration generation unit 141 generates a plurality of resource configuration information 157 using the workpiece characteristic information 152, the resource configuration constraints, and the production condition information 155. The resource configuration generation unit 141 also calculates the work allocation information 158 for each resource configuration information 157 using the production plan information 151 and the work time information 153. The resource configuration generation unit 141 may calculate the work allocation information 158 for each resource configuration information 157 by leveling the machining time in all main resources included in the production resource using the production plan information 151 and the work time information 153. Here, leveling means obtaining a combination of processing machines and workpieces so that the maximum value of machining time becomes as small as possible when all machining time is calculated. By leveling the machining time, the time required to complete the production of all production quantities specified in the production plan information 151 can be shortened.

As a method of allocating workpieces to processing machines, the resource configuration generation unit 141 may allocate workpieces so that the number of the processing machine to be used is as small as possible. By narrowing down the number of processing machines to be used, it is expected to reduce the variation in quality and the power consumption of the equipment. When there is a resource configuration candidate that satisfies the production condition information 155, the resource configuration generation unit 141 starts the processes of the layout generation unit 142. When there is no resource configuration candidate that satisfies the production condition information 155, the resource configuration generation unit 141 accepts the change of the production condition information 155 and starts the processes of the layout generation unit 142 again.

For each resource configuration information 157, the layout generation unit 142 generates a plurality of layout candidates that satisfy the resource arrangement constraints, which are constraints on the arrangement between production resources, and the production condition information 155. When no layout candidate satisfying the cell occupancy area constraint can be generated for one of the plurality of the resource configuration information 157, the layout generation unit 142 generates a layout candidate using another one of the plurality of resource configuration candidate that is different from the previous resource configuration candidate.

The setup time calculation unit 143 calculates the setup time for each layout candidate using the resource configuration information 157, work allocation information 158, work order information 156, and resource candidate information 154. The setup time calculation unit 143 calculates the setup time for each selected layout candidate using the number of setup works in the production resource, the minimum time, and the travel speed and the travel distance of the grasping portion of the production resource. The setup time is calculated for each selected layout candidate.

For each selected layout candidate, the cell size calculation unit 144 calculates the horizontal width, the vertical width, and occupancy area of each cell, using the dimensions of the production resource contained in the resource candidate information 154.

The layout evaluation unit 145 evaluates the layout candidates using the setup time or the occupancy area.

The input unit 110 receives input information that is displayed and operated on a screen, for example, and is operated with a keyboard or mouse.

The output unit 120, for example, generates screen information that contains information to be output as a result of some process, and outputs it to a display computer.

Figure 13:
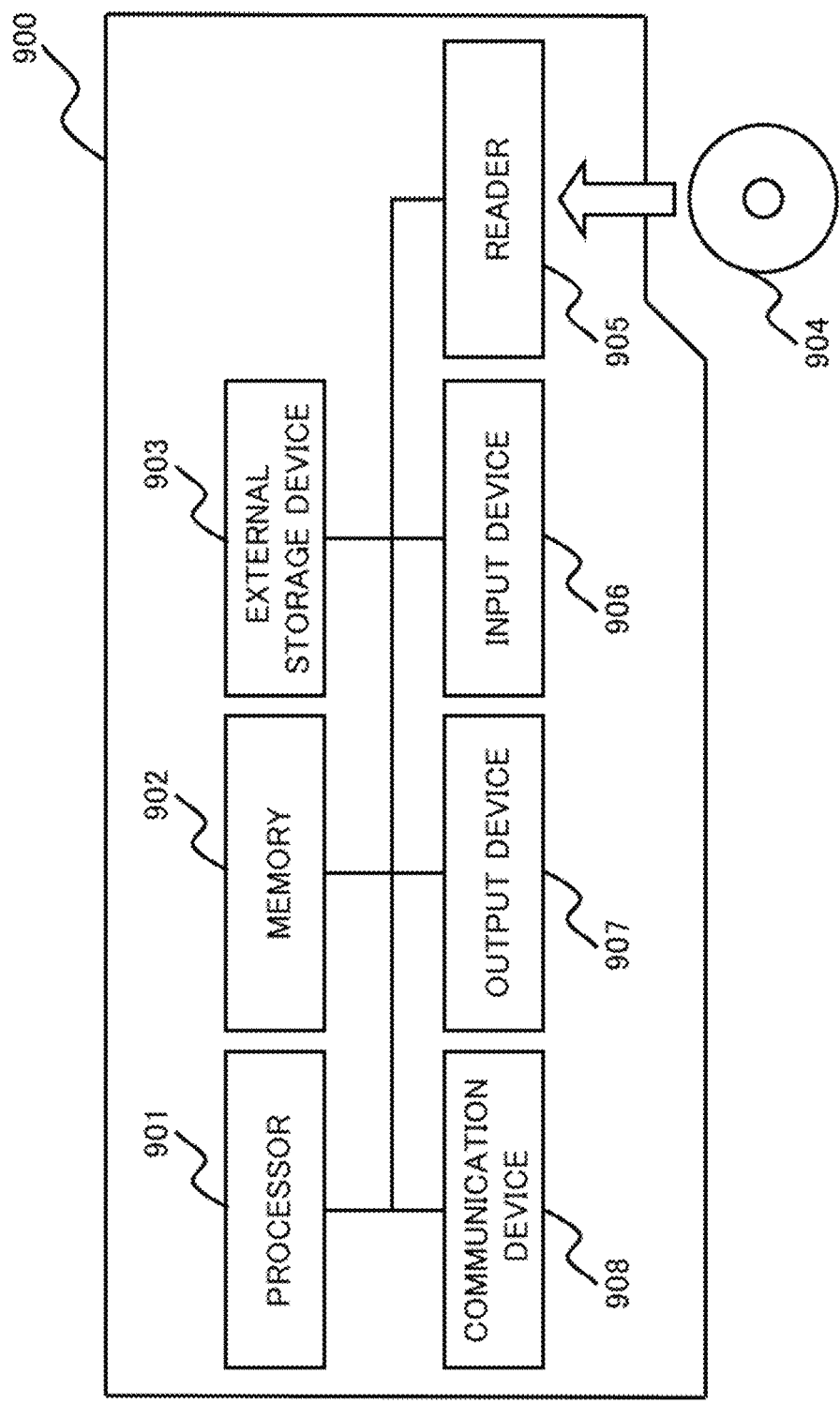
FIG. 13 illustrates an example of a hardware configuration of a production line design system.

FIG. 13 illustrates an example of the hardware configuration of a production line design apparatus. The production line design apparatus 100 can be realized by a general computer 900 that includes a processor (e.g., CPU or GPU) 901, a memory 902 such as RAM (Random Access Memory), an external storage device 903 such as a hard disk drive (HDD) or SSD, a reader 905 that reads information on a portable storage medium such as a CD or DVD, an input device 906 such as a keyboard, mouse, barcode reader, touch panel and the like, an output device 907 such as a display, and a communication device 908 that communicates with other computers via a network such as a LAN or the internet. The production line design apparatus 100 can also be realized by a network system equipped with the plurality of the general computer 900. Note that the reader 905 may be capable of not only reading but also writing the portable storage medium 904.

For example, the resource configuration generation unit 141, the layout generation unit 142, the setup time calculation unit 143, the cell size calculation unit 144, and the layout evaluation unit 145 can be realized by loading a predetermined program stored in the external storage device 903 into the memory 902 and executing the program by the processor 901. The input unit 110 can be realized by the processor 901 using input device 906. The output unit 120 can be realized by the processor 901 using the output device 907 or the communication device 908. The memory unit 150 can be realized by the processor 901 using the memory 902 or the external storage device 903.

This predetermined program may be downloaded onto the external storage device 903 from the portable storage medium 904 via the reader 905, or from the network via the communication device 908. The program is then loaded onto the memory 902 and executed by the processor 901. The program may also be loaded directly onto the memory 902 from the portable storage medium 904 via the reader 905 or from the network via the communication device 908 and then may be executed by the processor 901. The production line design apparatus 100 does not limited to this and may be a wearable computer such as a headset, goggles, glasses, intercom, and the like that can be worn by the operator.

Figure 14:
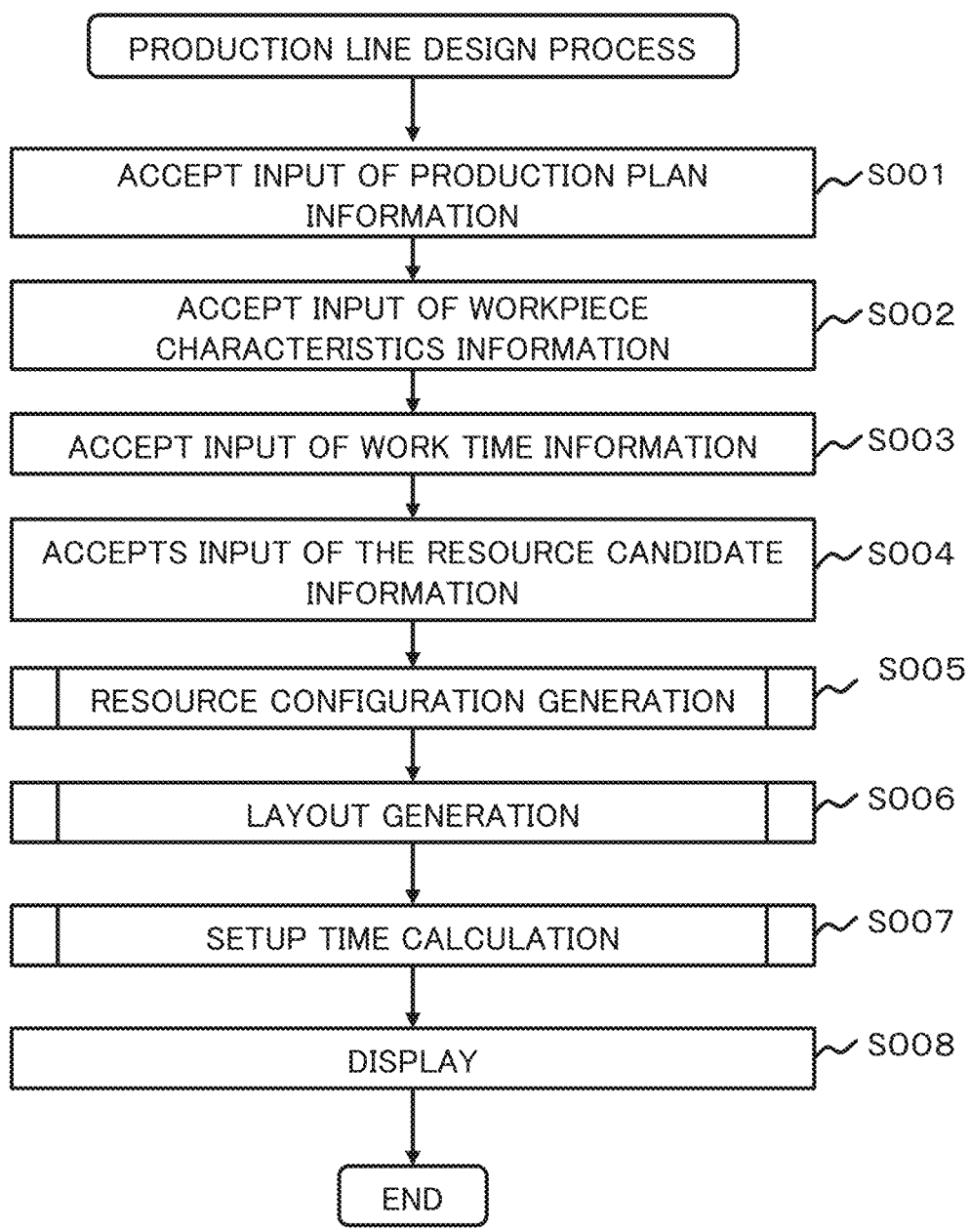
FIG. 14 illustrates an example of a flow of a production line design process.

FIG. 14 illustrates an example of a flow of a production line design process. The production line design process starts when a start instruction is received by the user via the interface device.

First, the input unit 110 accepts input of production plan information 151 (step S001). The production plan information 151 is defined for each workpiece to be produced.

Then, the input unit 110 accepts input of workpiece characteristic information 152 (step S002). The workpiece characteristic information 152 is defined for each workpiece to be produced.

Then, the input unit 110 accepts input of work time information 153 (step S003). The work time information 153 may be defined for each workpiece to be produced.

Then, the input unit 110 accepts input of the resource candidate information 154 (step S004). The resource candidate information 154 defines candidate resources for constructing a production line.

Then, the resource configuration generation unit 141 executes the resource configuration generation process described below using each information that is input and accepted (step S005).

Then, the layout generation unit 142 executes the layout generation process described below (step S006). Then, the setup time calculation unit 143 executes the setup time calculation process described below (step S007). Then, the output unit 120 displays the obtained results (step S008).

The above process is an example of the flow of the production line design process. According to the flow of the production line design process, it is possible to plan a production line design easily and accurately with low operation costs.

Figure 18B:
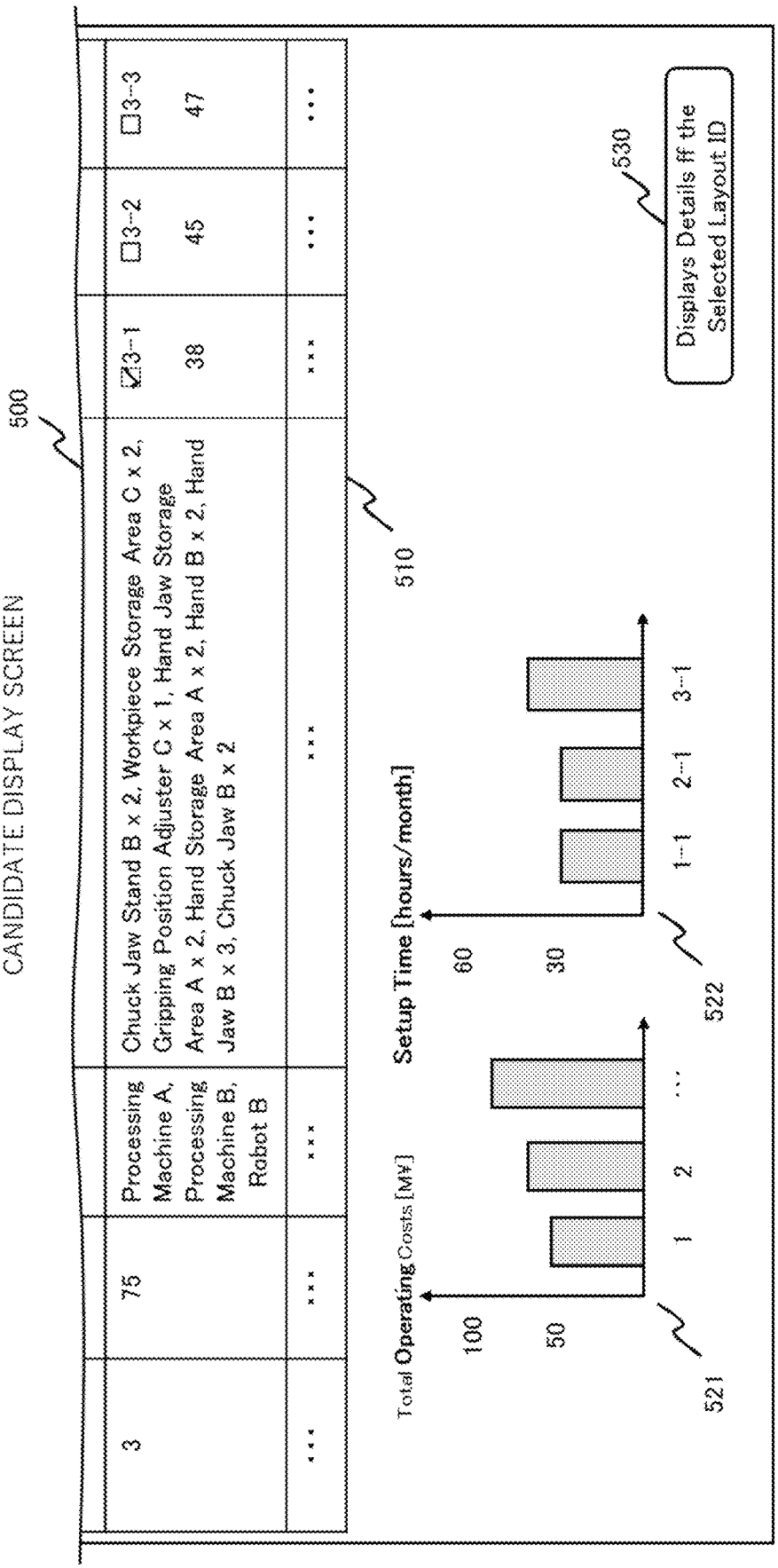

FIGS. 18A and 18B illustrate an example of a candidate display screen. The candidate display screen 500 is an example of the screen displayed in step S008 of the production line design process. The candidate display screen 500 includes a table 510, an operation cost comparison graph 521, a setup time comparison graph 522, and a layout detail display button 530.

Table 510 displays combinations of resource configuration candidates and layout candidates when adopting those resource configuration candidates from the top to the bottom of the screen in order of lowest to highest operation cost. Furthermore, the layout information is displayed from left to right in the order of shortest setup time.

When the check box indicating the combination ID of the resource configuration candidate and the layout candidate in table 510 is checked, the operation cost comparison graph 521 and the setup time comparison graph 522 are updated to compare the selected candidate combinations.

The layout detail display button 530, upon accepting the input, makes the screen transit to the detailed layout plan display screen 600 that shows the details of the layout ID whose checkbox is checked. The candidate display screen 500 allows the user to quantitatively compare the results of multiple production conditions based on cost and setup time.

Figure 19:
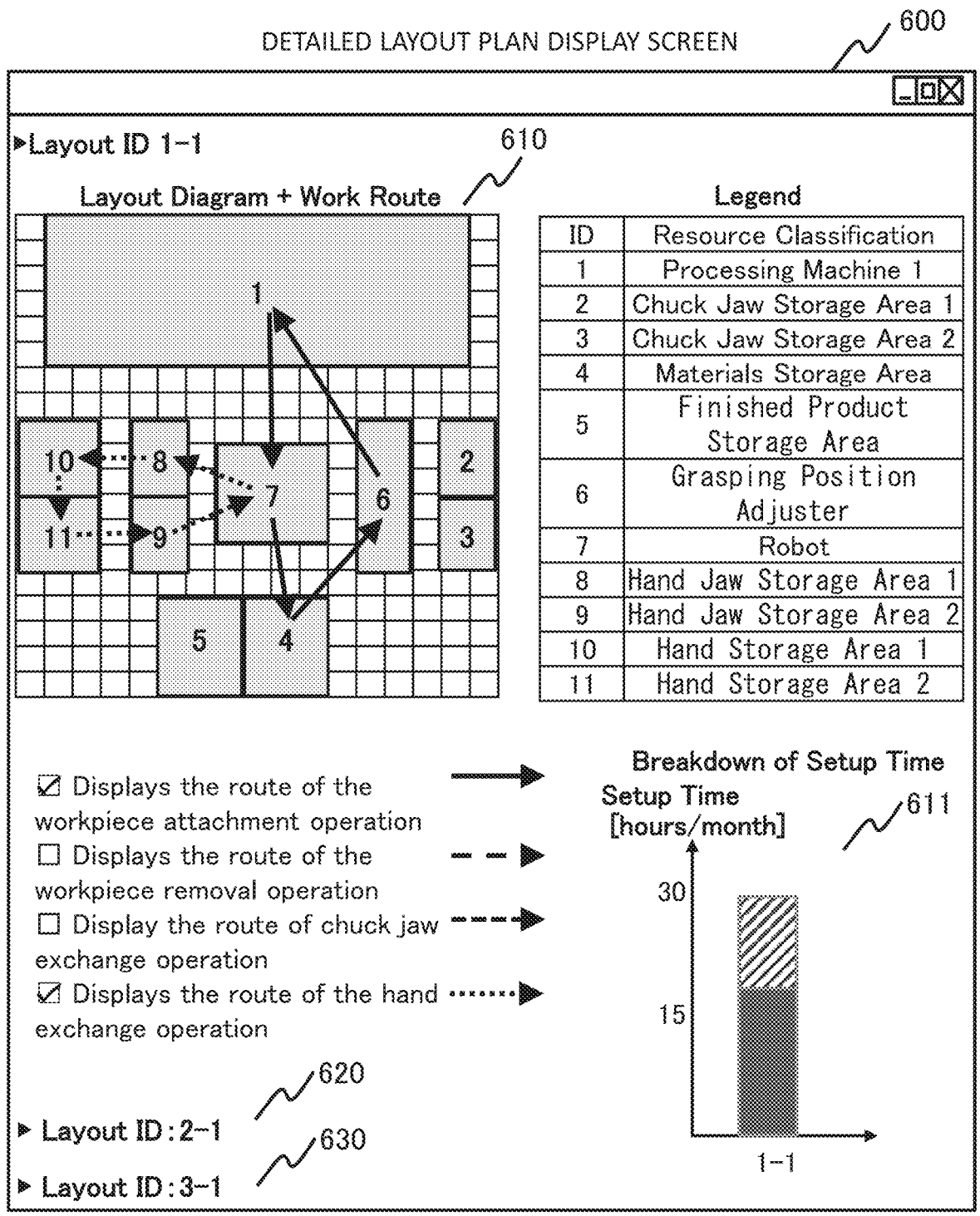
FIG. 19 illustrates an example of a detailed layout plan display screen.

FIG. 19 illustrates an example of a detailed layout plan display screen. The detailed layout plan display screen 600 is displayed when input to the layout detail display button 530 in the candidate display screen 500 is accepted.

The detailed layout plan display screen 600 displays a resource arrangement, work routes, and a setup time of the layout candidates. Specifically, the detailed layout plan display screen 600 includes expanders 610, 620, 630 with layout candidate IDs. When each expander is pressed, the layout diagram, work routes, a graph 611 is displayed. The graph 611 illustrates a breakdown of setup time (breakdown of setup time for workpiece, setup time for ancillary resources, and the like).

The layout diagram includes check boxes for displaying or hiding the workpieces and the work routes of the ancillary resources. Arrows indicating work routes are superimposed on the layout diagram for checked workpieces or ancillary resources. According to the detailed layout plan display screen 600, users can quickly understand the details of the layout and routs of the setup works, and by sharing the screen with multiple designers, they can quickly, easily, and accurately review the change plans of the layout.

Figure 15:
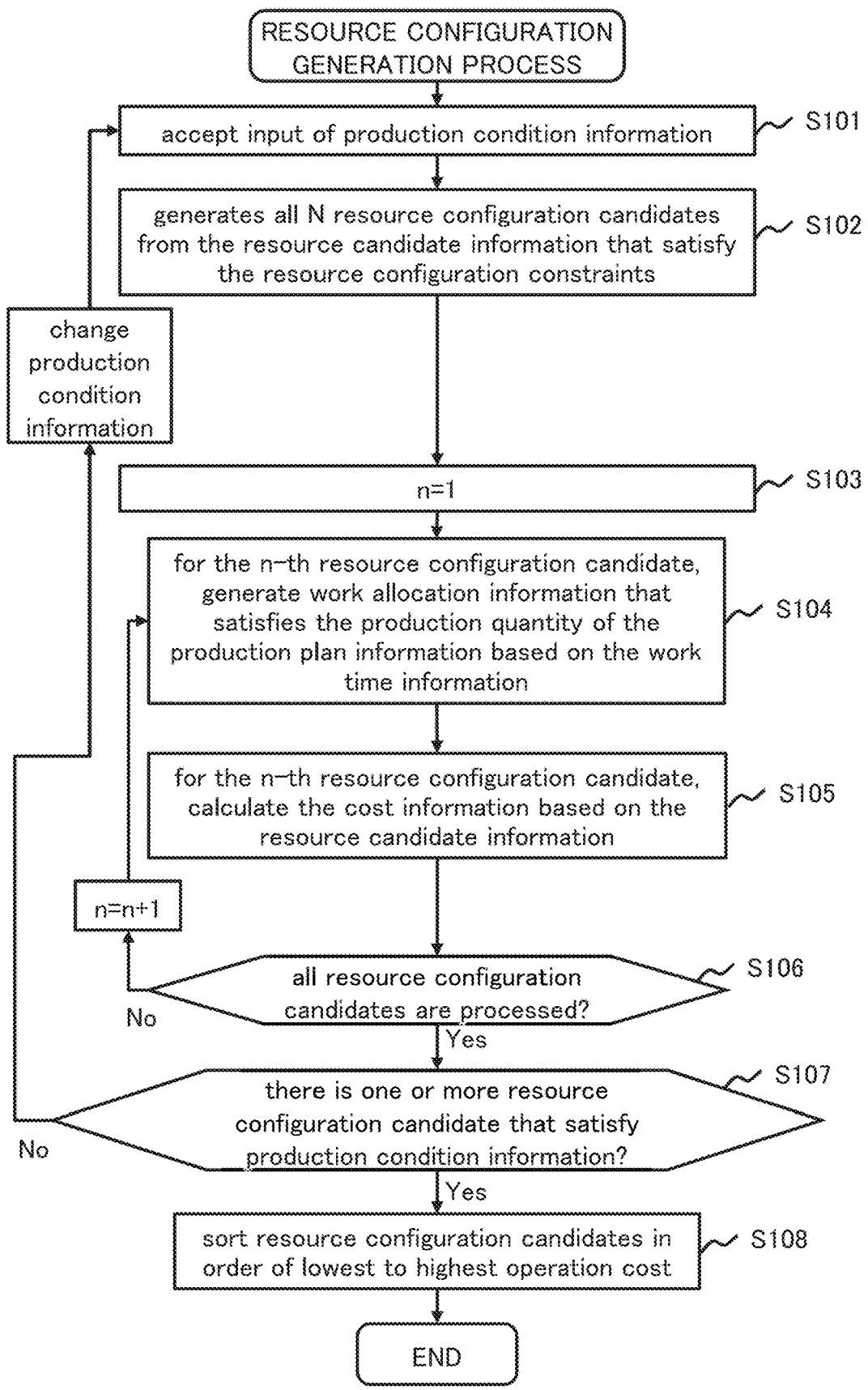
FIG. 15 illustrates an example of a flow of a resource configuration generation process.

FIG. 15 illustrates an example of the flow of the resource configuration generation process. The resource configuration generation process is initiated in step S005 of the production line design process.

First, the input unit 110 accepts input of production condition information 155 (step S101). Then, resource configuration generation unit 141 generates the all N (N is an integer greater than or equal to 1) resource configuration candidates from the resources stored in the resource candidate information 154 that satisfy the resource configuration constraints. The resource configuration generation unit 141 then stores the resource configuration candidates in the resource configuration information 157 (Step S102).

Here, the explanation of the resource configuration constraints is given. Resource configuration constraints embody constraints on the relationship between resources, the relationship between resources and workpiece, and the like, in the form of mathematical expressions that must be satisfied. For example, examples of resource configuration constraints are given in the equations (1) and (2). The equation (1) below is an example of resource configuration constraints for main resources and workpiece.

$$L_M > L_P \times \alpha_{MP} \qquad \text{Equation (1)}$$

In the above equation (1), $L_M$ denotes the upper limit of workpiece axis length in the processing machine (the upper limit of workpiece axis length 154$k$ in the resource candidate information 154), $L_P$ denotes the axis length of the target workpiece (axis length 152$c$), and $\alpha_{MP}$ denotes a margin (safety factor) to be provided when the workpiece is mounted on the processing machine.

The equation (1) defines the constraints that, when attaching the workpiece to the processing machine, the upper limit of workpiece axis length, which is the maximum workpiece axis length that the processing machine can machine, must be greater than the axis length of the workpiece allocated to the processing machine. This constraint allows the selection of the processing machine that satisfies the constraint in the above equation (1) when selecting the main resource for the operation in question.

the equation (2) below is an example of resource configuration constraints for main resources, ancillary resources, and workpieces.

$$PW_R > (W_P + W_H + W_{HC}) \times \alpha_R \quad \text{Equation (2)}$$

In the above equation (2), $PW_R$ denotes the robot's payload (the upper limit of workpiece weight 154r in the resource candidate information 154), $W_P$ denotes the weight of the target workpiece (weight 152d in workpiece characteristic information 152), $W_H$ denotes the weight of the hand (weight 154h in resource candidate information 154), $W_{HC}$ denotes the weight of the hand jaw (weight 154h in resource candidate information 154), and $\alpha_R$ denotes the safety factor for the total weight to be conveyed by the robot.

The equation (2) defines the constraints that, when the robot executes workpiece attachment and workpiece removal operations to the processing machine, the sum of the workpiece weight, the hand weight, and the hand jaw weight multiplied by the safety factor must not exceed the upper limit of the robot's payload. This constraint makes it possible to select only robots that satisfy the weight constraint in the above equation (2) when selecting a robot as the main resource to execute setup work.

Similarly, the constraints may define the precondition that the production line consists of multiple cells, and that each cell comprises at least one or more multiple processing machines and either one robot or one operator. By defining such a constraint equation, it is possible to define the relationship that must be satisfied by the main resource that executes the machining process and the main resource that executes the setup work before and after the machining process.

In addition, a constraint equation can be defined that defines that the robot needs at least one hand to grasp a workpiece. By defining constraint equation in this way, the relationship between main resources and ancillary resources can be defined.

Furthermore, a constraint equation can be defined that defines that one or more hand storage areas are needed when there are two or more hands. By defining constraint equation in this way, it is possible to define the relationship between ancillary resources.

Then, the resource configuration generation unit 141 set n=1 to initializes a variable n (step S103). The variable n is an integer greater than or equal to 1. The variable n is used to select a resource configuration candidate to be processed from the N generated resource configuration candidates.

Then, the resource configuration generation unit 141 allocates the target workpiece to the processing machine to satisfy the production quantity specified in the production plan information 151 based on the work time information 153, and thus generates the work allocation information 158 (step S104). As a method of allocating workpieces to processing machines, the resource configuration generation unit 141 can allocate workpieces so that the number of processing machines to be used is as small as possible.

Then, the resource configuration generation unit 141 uses the resource candidate information 154 to calculate the cost information 159 of the n-th resource configuration (step S105). Specifically, the resource configuration generation unit 141 acquires the resource model name 157d of the n-th resource configuration from the resource configuration information 157, acquires the purchase price 154e that matches the name 154b in the resource candidate information 154, and insert the acquired value into the purchase price 159c of the cost information 159. The resource configuration generation unit 141 divides the purchase price by the depreciation period (60 months) of the production condition information 155 to calculate the depreciation cost 159d.

For a resource configuration candidate in which a worker, not a robot, is used as the resource, the resource configuration generation unit 141 calculates the labor cost 159e by multiplying the labor cost unit price in the production condition information 155 by the production period. Then, the resource configuration generation unit 141 calculates the operation cost 159f by adding the depreciation cost 159d and the labor cost 159e. The resource configuration generation unit 141 calculates the operation cost 159f for each of the resources constituting the n-th resource configuration candidate and generates the cost information 159 respectively.

Then, the resource configuration generation unit 141 determines whether all of the N resource configuration candidates is processed (step S106).

When there are unprocessed resource configuration candidates ("No" in step S106), the resource configuration generation unit 141 increments the number n of the processed resource configuration candidates and returns the control to step S104.

When there are no unprocessed resource configuration candidates ("Yes" in step S106), the resource configuration generation unit 141 determines whether or not one or more of the N resource configuration candidates satisfies the conditions specified in the production condition information 155 (step S107).

When none of the resource configuration candidates satisfies the conditions specified in the production condition information 155 ("No" in step S107), the resource configuration generation unit 141 accepts the changes to the production condition information 155 and returns the control to step S101. For example, the condition can be relaxed by changing the set value of the production condition to a larger value.

When there is one or more resource configuration candidates that satisfies the conditions specified in the production condition information 155 ("Yes" in step S107), the resource configuration generation unit 141 sorts N resource configuration candidates in order of lowest to highest operation cost (step S108). Note that the sorting is not limited to sort the resource configuration candidates in order of lowest to highest operation cost, and the resource configuration generation unit 141 may sort the resource configuration candidates based on other indicators. For example, the resource configuration generation unit 141 may use the maximum machining time as the indicator to obtain the result of minimizing the time to complete machining all workpieces listed in the production plan information 151. Also, by using the total occupancy area as the indicator, the resource configuration generation unit 141 can obtain a result that minimizes the area occupied by the resource while satisfying the constraints. Furthermore, the resource configuration generation unit 141 may provide weighting factors for the cost, the processing time, and the cell occupancy area, respectively, to obtain an optimal result based on a weighted linear sum of the cost, the processing time, and the occupancy area.

The above is the example of the flow of the resource configuration generation process. According to the resource configuration generation process, N candidate resource configurations can be generated to satisfy the production conditions while satisfying the production plan.

Figure 16:
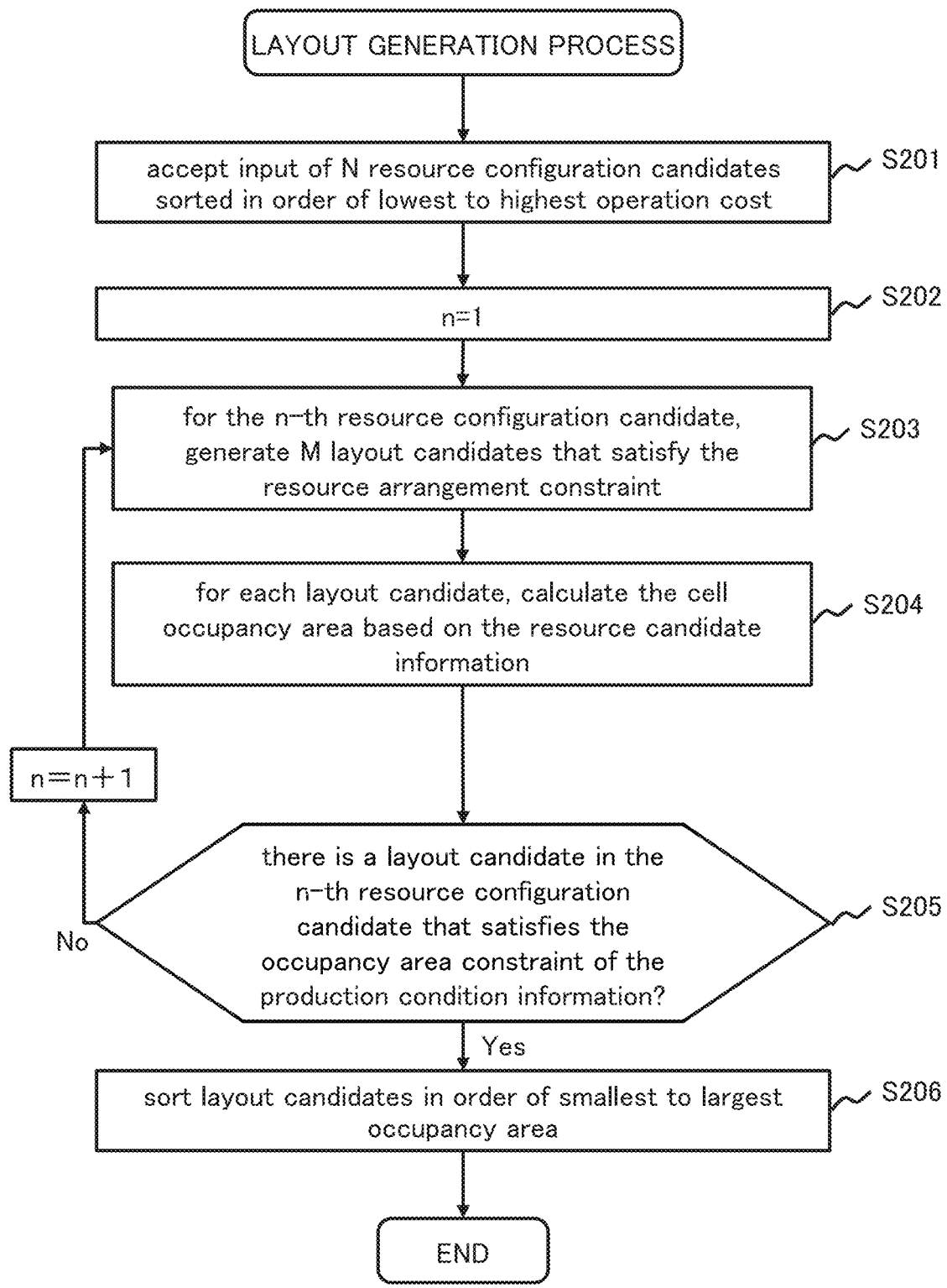
FIG. 16 illustrates an example of a flow of a layout generation process.

FIG. 16 illustrates an example of the flow of the layout generation process. The layout generation process is initiated in step S006 of the production line design process.

First, the input unit 110 accepts the input of N resource configuration candidates sorted in order of lowest to highest operation cost (Step S201). Then, the layout generation unit 142 set n=1 to initializes a variable n (step S202). The variable n is an integer greater than or equal to 1. The variable n is used to select a resource configuration candidate to be processed from the N generated resource configuration candidates.

Then, the layout generation unit 142 generates all layout candidates satisfying the resource arrangement constraints for the n-th resource configuration candidate and stores the layout candidates in the layout information 160 in the memory unit 150 (step S203). The number of layout candidates generated here is M (M is an integer).

Here, the explanation of the resource arrangement constraints is given. The resource arrangement constraints embody constraints on the layout arrangement in the relationship between resources, resources and the cells, and the like, in the form of mathematical expressions that must be satisfied. For example, examples of the resource arrangement constraints are depicted in the equations (3) and (4). The equations (3) and (4) below are examples of resource arrangement constraints on the relationship between the resources and cell outline.

$$X_i > W_i/2 \qquad \text{equation (3)}$$

In the above equation (3), $X_i$ denotes the X-coordinate (the center X coordinate 160d of the layout information 160) of the center point of the resource i (i denotes a specific resource in the cell), and $W_i$ denotes the horizontal external dimension (the resource horizontal width 160g) of resource i. That is, the above equation (3) is a constraint equation that defines the constraint that in X-coordinate, the leftmost coordinate of the resource must be greater than the origin of the cell outline.

$$X_i + W_i/2 < W_c \qquad \text{equation (4)}$$

In the above equation (4), $W_c$ denotes the upper limit of the cell's horizontal external width (set value 155c of the cell width upper limit [m] in the production condition information 155). That is, the above expression (4) is a constraint equation that defines the constraint that in the X-coordinate, the rightmost coordinate of the resource must not exceed the value of the cell width upper limit.

In other words, by using the resource arrangement constraints of the equations (3) and (4), it is possible to generate a resource layout that satisfies the cell width upper limit specified in the production condition information. Similarly, by using the same resource arrangement constraints for the Y-coordinate, a layout can be generated that satisfies the vertical cell width upper limits.

Other resource arrangement constraints can be defined in the same way, by formulating the constraints that resources must be arranged so that they do not overlap with other, or that the minimum necessary space must be secured between the resources. In other words, by defining constraint equations, it is possible to define the resource arrangement rules when generating layouts.

The cell size calculation unit 144 calculates the cell occupancy area for M layout candidates in the n-th resource configuration candidate based on the configuration information of the resource configuration candidate (Step S204). Specifically, the cell size calculation unit 144 calculates the horizontal width, the vertical width, and the occupancy area of each cell for each layout candidate.

Then, the layout generation unit 142 determines whether or not one or more layout candidates that satisfy the constraints on the cell occupancy area calculated from the cell width upper limit and the cell high upper limit specified in the production condition information 155 exist in the n-th resource configuration candidate (step S205).

When there is no layout candidate that satisfies the occupancy area constraint in the n-th resource configuration candidate ("No" in step S205), the layout generation unit 142 increments the number n of the processed resource configuration candidates (i.e., changes n so that a different resource configuration candidate is used than the resource configuration candidate) and returns the control to step S203 to regenerate the layout candidate.

When there is one or more layout candidates that satisfies the occupancy area constraint in the n-th resource configuration candidate ("Yes" in step S205), the layout generation unit 142 sorts the layout candidates in order of smallest to largest occupancy area and stores them in the layout information 160 (step S206).

When all the layout candidates generated for all the resource configuration candidates do not satisfy the occupancy area constraint, the layout generation unit 142 may generate the layout candidates again by relaxing the production condition by changing the set value of the upper limit of the occupancy area to larger value.

In step S206, the layout candidates are sorted in order of smallest to largest occupancy area. Therefore, even when there are multiple layout candidates with the same setup time calculated in the following steps, the layout candidates with the smaller occupancy area can be ranked with priority. However, present embodiment is not limited to this. For example, when the constraint on the horizontal width of the cell is more severe than that on the vertical width of the cell, the horizontal width of the cell, on which more severe constraint is imposed, may be used as an evaluation index for sorting. By using the horizontal width of the cell as the evaluation index, even when there are multiple layout candidates with the same setup time calculated later, the layout candidates with smaller horizontal width of the cell can be ranked with priority.

The above is the example of the flow of the layout generation process. According to the layout generation process, M layout candidates that satisfy the predetermined production conditions can be generated using N resource configuration candidates.

Figure 17:
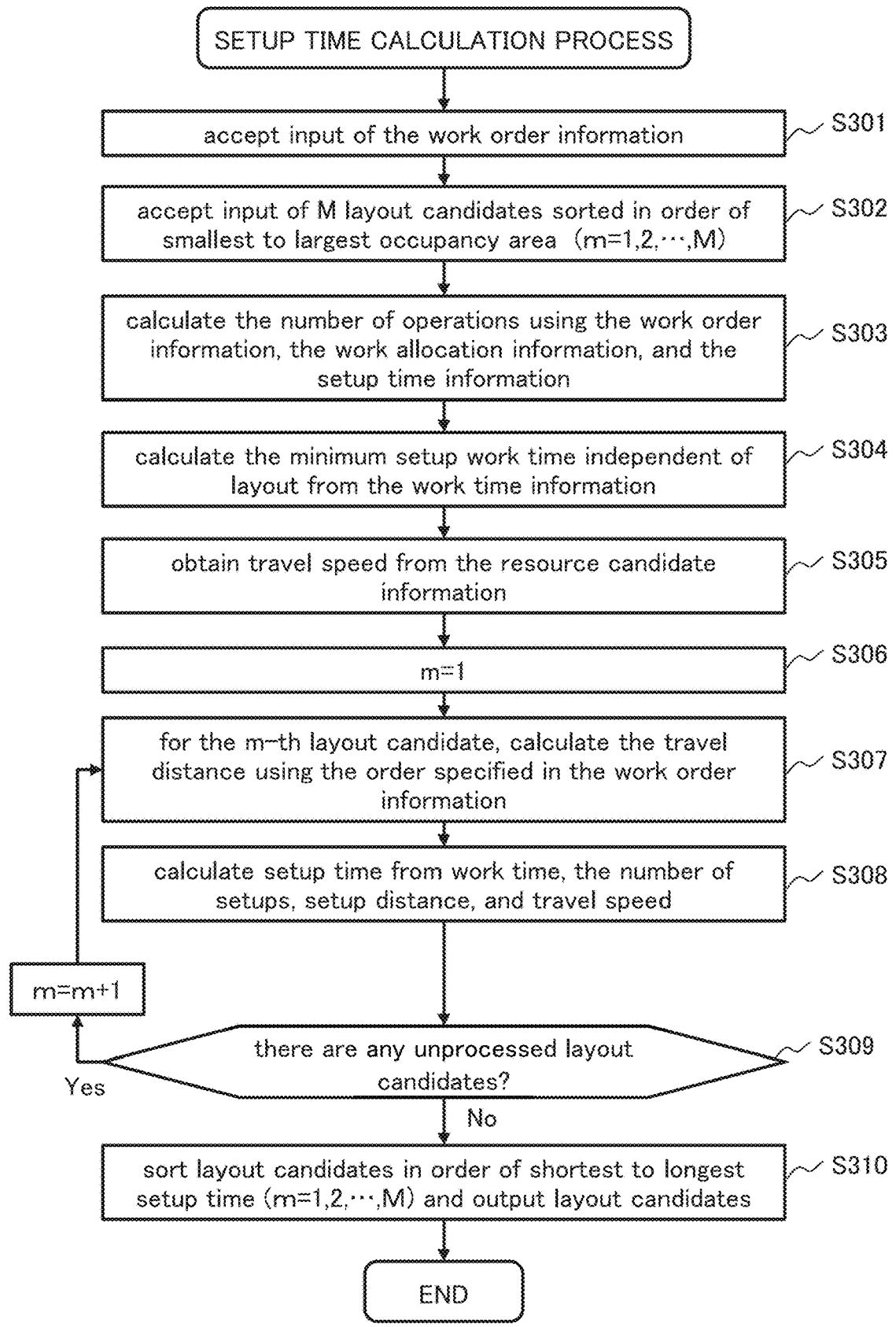
FIG. 17 illustrates an example of a flow of a setup time calculation process.

FIG. 17 illustrates an example of a flow of a setup time calculation process. The setup time calculation process is initiated in step S007 of the production line design process.

First, the input unit 110 accepts input of work order information 156 (step S301). Then, the input unit 110 accepts input of M layout candidates sorted in order of smallest to largest cell occupancy area (step S302).

Then, the setup time calculation unit 143 calculates, for the m-th layout candidate, the number of operations for each setup work, based on the work order information 156, the work allocation information 158, and the setup time information 161 (step S303). Specifically, the explanation will be given for the case of "Workpiece Attachment" in the setup time information 161 where the production month 161a is "Jan.", the cell ID 161b is "1", and the work ID 161c is "1". Also, the explanation will be given for the case of "Workpiece Removal" where the production month 161a is "Jan.", the cell ID 161b is "1", and the work ID 161c is "2". In this case, the work frequency 156c is "per Workpiece". Therefore, the setup time calculation unit 143 adds all the production quantity whose cell ID 158b are "1" in the work allocation information 158 to obtain the number of the operation of "440" times for each of the "Workpiece Attachment" and the "Workpiece Removal" whose work ID is "1" and "2", respectively, Then, the setup time calculation unit 143 calculates the minimum setup time required regardless of the layout information 160 based on the work allocation information 158 and the work time information 153 (step S304). Specifically, in the above case, the setup time calculation unit 143 calculates the minimum setup time by the product of the unit operation time and the number of times of the operations. Here, the unit operation time is a value predefined in the work time information 153 and is obtained according to the type of main resource performing the setup work. For example, since the main resource selected for cell ID "1" is a robot, the unit operation time is "2" minutes according to the workpiece attachment time 153c. Multiplying the number of operations "440" times and the unit operation time "2" minutes calculated for the work ID, the minimum setup time is calculated to be "880" minutes.

Then, the setup time calculation unit 143 obtains the travel speed for each resource using the resource candidate information 154 (step S305).

Then, the setup time calculation unit 143 set m=1 to initializes a variable m (step S306). The variable m is used to select a layout candidate to be processed from the layout candidates accepted in the step S302.

Then, the setup time calculation unit 143 calculates, for the m-th layout candidate stored in the layout information 160, the unit travel distance of setup work performed in the order specified in the work order information 156 (step S307). The unit travel distance is the total distance between the center coordinates of the resources used in the setup work.

For example, in the previous example, the order in which the resources are used when the robot executes the workpiece attachment with a work ID of "1" is workpiece storage area, grasping position adjuster, processing machine, and robot, as defined in the work order information 156. Then, the setup time calculation unit 143 checks the logical resource 157c of the resource configuration information 157 to identify each resource model name 157d as "Robot 1", "Workpiece Stand A", "Grasping Position Adjuster A", "Machine 1", and "Robot 1", respectively.

Then, the setup time calculation unit 143 uses the resource model name to check the layout information 160 and identifies the value of the center coordinates (X, Y) of each resource. Then, the setup time calculation unit 143 calculates the unit travel distance as Euclidean distance using the following equation (5).

$$UHD = \sum \{(X_{i+1} - X_i)^2 + (Y_{i+1} - U_i)^2\}^{\frac{1}{2}} \quad \text{equation (5)}$$
$$(i = 1, 2, ..., N)$$

In the above equation (5), UHD denotes the unit travel distance, $X_i$ denotes the X-coordinate of the center point of resource i, $Y_i$ denotes the Y-coordinate of the center point of resource i, N denotes the total number of resources used in the setup work (the maximum value of the work order 156e in the work order information 156).

For example, using the above equation (5), the local Euclidean distance between the robot and the workpiece storage area is calculated to be "3.64". Here, the distance between the resources may be calculated as a Manhattan distance. Calculating as Manhattan distance has the advantage that the distance can be expressed as a linear expression instead of a quadratic expression, and thus can be solved by integer programming or other methods. Similarly, when the distances between all resources in the work order are calculated and summed, the unit travel distance becomes "17.5".

Then, the setup time calculation unit 143 calculates the setup time of the m-th layout candidate by using the number of operations calculated in step S303, the minimum setup time calculated in step S304, the travel speed obtained in step S305, and the travel distance calculated in step S307, and stores the setup time in the setup time information 161 (step S308). Specifically, the setup time calculation unit 143 calculates the setup time using the following equation (6).

$$HT = HN \times (UHT_{min} + UHD/HV) \quad \text{equation (6)}$$

In the equation (6), HT denotes the setup time, HN denotes the number of operations of the setup work, and $UHT_{min}$ denotes the minimum setup time required independent of the layout, UHD denotes the unit travel distance per operation, and HV denotes the travel speed of the main resource executing the setup work.

Then, the setup time calculation unit 143 determines whether there are any unprocessed layout candidates among all M layout candidates (step S309). When there is an unprocessed layout candidate ("Yes" in step S309), the setup time calculation unit 143 adds 1 to the number m of the layout candidates to be processed and returns the control to step S307.

When there are no unprocessed layout candidates ("No" in step S309), the setup time calculation unit 143 sorts all M layout candidates in order of shortest to longest setup time and stores them in the layout information 160 (step S310). By sorting in order of shortest to longest setup time, the user can easily check the layout information with the shortest setup time and easily compare it with the layout information with the second or third shortest setup time, or the like. The sorting may also be done in order of smallest to largest occupancy area. By sorting layout candidates in order of smallest to largest occupancy area, user can easily compare layout information with smaller occupancy area when the user want to find a layout with smaller occupancy area than the layout with shorter setup time.

The above is an example of the flow of the setup time calculation process. According to the setup time calculation process, setup time can be calculated for M layout candidates.

The above is the configuration of the production line design system 1. According to the production line design system 1, it is possible to plan a line design that minimizes setup time in a short time without rework and without relying on the know-how of engineers. That is, the production line design can be easily and precisely planned with low operation costs.

The present invention is not limited to the above examples, but includes various variations. The above embodiments are described in detail for the purpose of clearly explaining the invention, and are not necessarily limited to those having all the described configurations. It is possible to replace some of the configurations of the embodiments with other configurations. It is also possible to delete some of the configurations of the embodiments.

In addition, each of the above elements, configurations, functions, processing units and the like may be realized in hardware by designing some or all of them, for example, in an integrated circuit. In addition, each of the above elements, configurations, functions, and the like may be realized in software by a processor interpreting and executing a program that realizes the respective function. Programs, tables, files, and other information that realize each function may be placed in a memory, a recording device such as a hard disk, or a storage medium such as an IC card, SD card, DVD, and the like.

The control lines and information lines for the above embodiments are those considered necessary for explanation, and not all control lines and information lines are necessarily shown in the product. In reality, almost all configurations may be considered to be interconnected. As described above, the present invention is explained while focusing on the embodiments.

What is claimed is:

1. The production line design apparatus comprising:
   one or more processors;
   a display coupled to the one or more processors;
   one or more storage devices coupled to the one or more processors, the one or more storage devices storing resource configuration information defining production resources constituting a production line to be designed, resource arrangement constraint information defining an arrangement constraint on the production resources, a production condition to be satisfied by the production line, work allocation information including a workpiece allocated to the production resources and a number of the workpiece, work order information including the production resources used in setup works of the production line and an order of the setup works, and resource candidate information defining a specification of the production resources, the production resources being main resources and ancillary resources; and
   one or more memories coupled to the one or more processors, the one or more memories storing instructions that when executed by the one or more processors configure the one or more processors to:
   generate a plurality of layout candidates for each of the resource configuration information, each layout candidate satisfying the arrangement constraint and the production condition,
   calculate a setup time for each layout candidate using the resource configuration information, the work arrangement information, the work order information, and the resource candidate information,
   display, on the display, a layout candidate screen showing a table indicating the plurality of layout candidates and indicating, for each layout candidate, a main resource, an ancillary resource and a setup time, and
   display, on the display, a detailed layout plan screen indicating, for a selected layout candidate, among the plurality of layout candidates, a graph illustrating a breakdown of setup time for a workpiece.

2. The production line design apparatus according to claim 1,
   wherein the one or more storage devices store workpiece characteristic information including a dimension or a shape of the workpiece, a resource configuration constraint defining a constraint condition on a configuration of the production resources by categorizing the production resources into main resources and ancillary resources, a production plan including a production period of the workpieces and a number of the workpieces, and a work time for each workpiece,
   wherein the one or more processors are configured to:
   generate a plurality of the resource configuration information using the resource configuration constraint and production condition, and calculate the work allocation information for each of the resource configuration information using the production condition and the work time.

3. The production line design apparatus according to claim 1,
   wherein the one or more processors are configured to calculate a horizontal width, a vertical width, and an occupancy area of each cell for each selected layout candidate using dimensions of the production resources included in the resource candidate information.

4. The production line design apparatus according to claim 1,
   wherein the production condition includes at least a constraint on an occupancy area of a cell,
   wherein the storage device stores a plurality of the resource configuration information, and
   wherein the one or more processors are configured to, when none of the layout candidate generated using one of the plurality of the resource configuration information satisfies the constraint on the occupancy area of the cell, generate the layout candidate using an another one of the plurality of the resource configuration information.

5. The production line design apparatus according to claim 1,
   wherein the one or more processors are configured to calculate the setup time for each of the selected layout candidate using a number of setup works in the production resources, a minimum time, and a travel speed and travel distance of a grasping portion of the production resources.

6. The production line design apparatus according to claim 1,
   wherein the one or more processors are configured to evaluate the layout candidate using the setup time.

7. The production line design apparatus according to claim 1,
   wherein the one or more processors are configured to evaluate the layout candidate using an occupancy area of a cell.

8. The production line design apparatus according to claim 1,
   wherein the storage device is configured to further store workpiece characteristic information including a dimension or a shape of the workpiece, a resource configuration constraint defining a constraint condition on a configuration of the production resources by categorizing the production resources into main resources and ancillary resources, a production plan including a production period of the workpieces and a number of the workpieces, and a work time for each workpiece,
   wherein the one or more processors are configured to generate a plurality of the resource configuration information using the resource configuration constraint and the production condition, and calculate the work allocation information by leveling machining times in all of the main resources included in the production resources.

9. The production line design apparatus according to claim 1,
   wherein the storage device is configured to further store workpiece characteristic information including a dimension or a shape of the workpiece, a resource configuration constraint defining a constraint condition on a configuration of the production resources by categorizing the production resources into main resources and ancillary resources, a production plan including a production period of the workpieces and a number of the workpieces, and a work time for each workpiece, wherein the one or more processors are configured to:

generate a plurality of the resource configuration information using the resource configuration constraint and the production condition, and calculate the work allocation information for each of the resource configuration information using the production condition and the work time, wherein, when there is a resource configuration candidate that satisfies the production condition, begin generating the plurality of layout candidates, and when there is not a resource configuration candidate that satisfies the production condition, accept a change in the production condition and generates resource configuration candidate again.

10. A production line design system including a production line design apparatus, the production line design apparatus comprising:

one or more processors;

a display coupled to the one or more processors;

one or more storage devices coupled to the one or more processors, the one or more storage devices storing resource configuration information defining production resources constituting a production line to be designed, resource arrangement constraint information defining an arrangement constraint on the production resources, a production condition to be satisfied by the production line, work allocation information including a workpiece allocated to the production resources and a number of the workpiece, work order information including the production resources used in setup works of the production line and an order of the setup works, and resource candidate information defining a specification of the production resources the production resources being main resources and ancillary resources; and one or more memories coupled to the one or more processors, the one or more memories storing instructions that when executed by the one or more processors configure the one or more processors to:

generate a plurality of layout candidates for each of the resource configuration information, each layout candidate satisfying the arrangement constraint and the production condition, calculate a setup time for each layout candidate using the resource configuration information, the work arrangement information, the work order information, and the resource candidate information, display, on the display, a layout candidate screen showing a table indicating the plurality of layout candidates and indicating, for each layout candidate, a main resource, an ancillary resource and a setup time, and display, on the display, a detailed layout plan screen indicating, for a selected layout candidate, among the plurality of layout candidates, a graph illustrating a breakdown of setup time for a workpiece.

11. A production line design method using a production line design apparatus, the production line design apparatus including one or more processors;

a display coupled to the one or more processors; one or more storage devices coupled to the one or more processors, the one or more storage devices storing resource configuration information defining production resources constituting a production line to be designed, resource arrangement constraint information defining an arrangement constraint on the production resources, a production condition to be satisfied by the production line, work allocation information including a workpiece allocated to the production resources and a number of the workpiece, work order information including the production resources used in setup works of the production line and an order of the setup works, and resource candidate information defining a specification of the production resources, the production resources being main resources and ancillary resources, the method comprising:

generating a plurality of layout candidates for each of the resource configuration information, each layout candidate satisfying the arrangement constraint and the production condition;

calculating a setup time for each layout candidate using the resource configuration information, the work arrangement information, the work order information, and the resource candidate information;

displaying, on the display, a layout candidate screen showing a table indicating the plurality of layout candidates and indicating, for each layout candidate, a main resource, an ancillary resource and a setup time, and displaying, on the display, a detailed layout plan screen indicating, for a selected layout candidate, among the plurality of layout candidates, a graph illustrating a breakdown of setup time for a workpiece.

* * * * *